United States Patent [19]

Kahn et al.

[11] 4,387,109

[45] Jun. 7, 1983

[54] INTERMEDIATE-MOISTURE FROZEN OIL-IN-WATER EMULSION FOODS

[75] Inventors: Marvin L. Kahn, Williamsville; Kuttikandathil E. Eapen, Kenmore, both of N.Y.

[73] Assignee: Rich Products Corporation, Buffalo, N.Y.

[21] Appl. No.: 304,022

[22] Filed: Sep. 21, 1981

Related U.S. Application Data

[60] Division of Ser. No. 125,516, Mar. 14, 1980, abandoned, which is a continuation-in-part of Ser. No. 23,931, Mar. 26, 1979, Pat. No. 4,244,976, Ser. No. 23,973, Mar. 26, 1979, Pat. No. 4,244,977, Ser. No. 23,974, Mar. 26, 1979, Pat. No. 4,308,287, Ser. No. 24,127, Mar. 26, 1979, Pat. No. 4,235,936, Ser. No. 24,128, Mar. 26, 1979, Pat. No. 4,234,611, Ser. No. 24,129, Mar. 26, 1979, Pat. No. 4,220,671, Ser. No. 24,130, Mar. 26, 1979, Pat. No. 4,237,146, and Ser. No. 21,937, Apr. 19, 1979, Pat. No. 4,248,902, each is a continuation-in-part of Ser. No. 917,379, Jun. 20, 1978, Pat. No. 4,199,604, Ser. No. 871,995, Jan. 24, 1978, Pat. No. 4,154,863, and Ser. No. 763,613, Jan. 28, 1977, Pat. No. 4,146,652, said Ser. No. 125,516, is a continuation-in-part of Ser. No. 920,953, Jun. 30, 1978, Pat. No. 4,199,605, and Ser. No. 917,379.

[51] Int. Cl.$^3$ .............................................. A23G 9/02
[52] U.S. Cl. ................................ 426/321; 426/589; 426/658; 426/330; 426/331; 426/330.6; 426/330.3; 426/330.2; 426/613
[58] Field of Search ............... 426/321, 589, 658, 330, 426/331, 330.6, 330.3, 330.2, 327

[56] References Cited

U.S. PATENT DOCUMENTS

| | | | |
|---|---|---|---|
| 3,676,154 | 7/1972 | Glasser et al. | 426/589 |
| 3,694,589 | 9/1972 | Kaplow et al. | 426/589 |
| 3,769,042 | 10/1973 | Kaplow et al. | 426/589 |
| 3,867,560 | 2/1975 | Menzi et al. | 426/658 |
| 3,949,104 | 4/1976 | Cheng et al. | 426/589 |
| 4,038,424 | 7/1977 | Davies | 426/589 |
| 4,140,808 | 2/1979 | Jonson | 426/589 |
| 4,140,809 | 2/1979 | Glasser et al. | 426/589 |
| 4,220,671 | 9/1980 | Kahn et al. | 426/321 |
| 4,237,146 | 12/1980 | Kahn et al. | 426/330 |

Primary Examiner—Jeanette M. Hunter

[57] ABSTRACT

Microbiologically stable foods which are oil-in-water emulsions usually kept at freezer temperature, but which can be maintained at room temperature and refrigerator temperature for an extended period of time, are prepared by controlling their sugar/fat content.

These foods are of intermediate-moisture content and have sufficient solutes, generally sugars, to provide a bacteriostatic effect. The sugars used are predominantly of low molecular weight to additionally provide for a significant freezing point depression. A substantial amount of fructose, dextrose or a combination thereof is preferred for its resistance to crystallization which would cause apparent hardness at low temperatures. Finally, the product can more readily be maintained soft at freezer and room temperature if its fat content is at least in part unsaturated.

25 Claims, No Drawings

INTERMEDIATE-MOISTURE FROZEN OIL-IN-WATER EMULSION FOODS

CROSS-REFERENCE

This is a division of application Ser. No. 125,516 filed Mar. 14, 1980 now abandoned, which is a continuation-in-part of U.S. patent application Ser. Nos. 24,129, filed Mar. 26, 1979 now U.S. Pat. No. 4,220,671; 23,931, filed Mar. 26, 1979 now U.S. Pat. No. 4,244,976; 23,974, filed Mar. 26, 1979 now U.S. Pat. No. 4,308,287; 24,130, filed Mar. 26, 1979 now U.S. Pat. No. 4,327,146; 24,127, filed Mar. 26, 1979 now U.S. Pat. No. 4,235,936; 24,128, filed Mar. 26, 1979 now U.S. Pat. No. 4,234,611; 23,973, filed Mar. 26, 1979 now U.S. Pat. No. 4,244,977, 21,937, filed Mar. 19, 1979 now U.S. Pat. No. 4,248,902; which in turn are continuations-in-part and contain subject matter divided out of U.S. patent application Ser. Nos. 917,379, filed June 20, 1978 now U.S. Pat. No. 4,199,604; 871,995, filed Jan. 24, 1978, now U.S. Pat. No. 4,154,863; and 763,613, filed Jan. 28, 1977, now U.S. Pat. No. 4,146,652; the parent application Ser. No. 125,516, now abandoned is also a continuation-in-part of U.S. patent application Ser. Nos. 920,953, filed June 30, 1978 now U.S. Pat. No. 4,199,605; and 917,379, filed June 20, 1978 now U.S. Pat. No. 4,199,604.

FIELD OF THE INVENTION

The invention of this application is directed to microbiologically stable foods which are usually kept at freezer temperatures, but which can be maintained at room temperature for an extended period of time. The food products of this invention are substantially non-crystalline and flowable at freezer temperatures.

BACKGROUND OF THE INVENTION

A recent development in the food industry is the emphasis on intermediate-moisture foods which have the faculty of being stored and marketed in a substantially non-refrigerated condition. These foods were designed to avoid the need to be packaged in a hermetically sealed container and commercially sterilized or maintained in a frozen or refrigerated state throughout the period of distribution and storage by the consumer.

The intermediate-moisture foods are based on the principle of reducing the availability of water in the food for microbial growth. The availability for spore germination and microbial growth is closely related to its relative vapor pressure, commonly designated as water activity. It was found that the use of a wide variety of water-soluble solutes, or osmotic agents, has the effect of depressing the water activity of the foods to levels at which most bacteria will not grow.

The water activity of a food is defined as the partial pressure of water in the food divided by the saturation pressure of water at the temperature of the food. The water activity can be determined by placing a sample in a container which is then sealed, and after equilibrium is reached, determining the relative humidity above the sample. Most products of this type have between 10 to 40% moisture, and a water activity between 0.65 and 0.9.

An early application of the technique of controlling water activity was for animal foods. For example, U.S. Pat. No. 3,202,514, issued Aug. 24, 1965, discloses an animal food having 15 to 30% moisture and 15 to 35% water-soluble solids, principally sugar, with a proteinaceous meaty substance. Subsequently, other foods were formulated with an intermediate-moisture content, such as egg products (U.S. Pat. No. 3,640,731, issued Feb. 8, 1972), pancake batter (U.S. Pat. No. 3,753,734, issued Aug. 21, 1973) and whippable bases for confectionary use (U.S. Pat. No. 3,958,033, issued May 18, 1976). The water content and water activity of these foods are brought to as low a value as practical to insure their long-term stability without refrigeration. The main difficulty with these foods is that their low-moisture content may detract from their palatability, texture and mouth-feel. This technique therefore has found its greatest commercial applicability in the pet-food market where palatability requirements are not as stringent.

It is of course desirable to be able to avoid refrigeration and freezing of food products to reduce the cost involved, and particularly for the consumer, to avoid the inconvenience of unpacking, handling, and then defrosting the typically rock-hard frozen foods. However, freezing is an extremely safe and suitable technique for long-term storage and provides the manufacturer with great leeway in incorporating any of a wide variety of ingredients in foods which would otherwise be short-lived.

Accordingly, a class of intermediate-moisture foods has been found in accordance with Application Ser. No. 763,613, filed Jan. 28, 1977, now U.S. Pat. No. 4,146,652, and Application Ser. No. 871,995, filed Jan. 24, 1978, now U.S. Pat. No. 4,154,863, which combines the convenience of the freezing method of storage sought by manufacturers with the ease of handling desired by consumers. Such foods are normally stored at freezer temperatures, but upon removal from the freezer can be more readily handled because they retain a flexible consistency, are non-crystalline and spoonable within about 5 to about 15 minutes, and can be left at room temperature for an extended period of time as they possess the requisite microbiological stability.

The foods of the invention are generally characterized by a high sugar content, usually at least equal in weight to the amount of water present, in order to provide microbiological stability. The sugars employed have a low molecular weight, being primarily dextrose and fructose, which comprise together at least about 50% and preferably at least about 75% of the total sugar content. Sucrose has a sweetness between that of fructose and dextrose. The fructose, which is sweeter than the dextrose, is preferred sice it has a lesser tendency to crystallize and cause apparent hardness. For most foods, particularly where the food comprises an emulsion, it is preferred that the fats used, if any, include partially unsaturated fats which tend to provide superior flow properties and nutritional advantages, although less stable than saturated fats. The fat content is usually less than the water content in order to form a stable oil-in-water emulsion; the water content is preferably at least about 25% greater than the fat content.

The use of bacteriostatically effective amounts of sugar, however, imparts excessive sweetness to the ultimate food product. The problem of excessive sweetness has arisen previously in conjunction with the development of artificial sweeteners, and certain bitterness principles have been incorporated in such products to mask the undesirable taste. It was disclosed in U.S. Pat. No. 3,934,047, issued Jan. 20, 1976, that addition of aluminum potassium sulfate, naringen or a combination thereof to artificial sweeteners such as the saccharines or the cyclamates, or to higher caloric sweeteners such as sucrose, effectively reduced the perceived sweetness and bitter after taste of the artificial sweetener. It was postulated that the bitterness agent reduces the duration of sweetness, and presumably alters the manner in which sweetness is perceived.

In connection with neutralizing the bitter after taste of saccharine or saccharine salts, it was disclosed in German Pat. No. 2,060,634, issued Dec. 9, 1970, that the addition of about from 0.2 to 2.0 by weight percent of one or more substances having a bitter taste results in masking of the lingering bitterness associated with saccharine. Quinine sulfate and magnesium sulfate are specifically recommended as additives for use in this regard.

Such bitterness principles as quinine, theobromine and caffeine have also been advanced for use as flavor factors in synthetic and natural chocolate compounds and chocolate-flavored beverages to impart a bitter taste to the resultant foodstuff. U.S. Pat. No. 2,835,592, issued May 20, 1958, and U.S. Pat. No. 3,102,815, issued Sept. 3, 1963, are illustrative of such disclosures.

Further flavor modifiers which impart a bitterness to the compounds in which they are incorporated are disclosed in U.S. Pat. No. 3,647,482, issued Mar. 7, 1972, to Yueh, and U.S. Pat. No. 4,006,261, issued Feb. 1, 1977, to Pickenhagen et al. Yueh's patent discloses the use of ribonucleotides, ribonucleosides and their deoxy analogues to reduce or eliminate the bitter after taste associated with saccharine or saccharine salts, or compositions containing these sweeteners. Pickenhagen et al. disclose the use of compositions of theobromine in combination with cyclic dipeptides to impart bitterness and astringency properties to various foodstuffs, especially cocoa products, animal foods, beverages, pharmaceutical preparations and tobacco products.

In U.S. Pat. No. 3,371,543, issued Feb. 13, 1973, the use of theobromine, caffeine or naringen to impart bitterness to nitrogen-based flavor intensifiers is disclosed.

It is an object of the present invention to provide a class of foods which are normally maintained at freezer temperature, but which possess the requisite microbiological stability for storage at refrigerator or room temperatures for an extended length of time without spoilage.

It is another object of the present invention to provide an improved bacteriostatic intermediate moisture food product which is ready for use at freezer temperature, the perceived sweetness of which has been reduced through the addition of a bitterness factor.

It is a further object of this invention to accomplish the above-specified reduction in sweetness perception through the use of certain quinine salts.

Other objects, and advantages, of this invention will be apparent from the ensuing specification and examples.

THE INVENTION

The present invention is directed to microbiologically stable intermediate-moisture foods and other products which are normally maintained at freezer temperature. The principles and techniques which have been developed for intermediate-moisture foods are applicable to the present invention, as modified in the manner explained herein below. Many of the foods of this invention are maintainable at freezer temperature in a condition ready for immediate use. After removal from the freezer the foods may be held at room temperature or at refrigerator temperature for a considerable period of time without spoilage because of the bacteriostatic effect of the sugar/water ratio.

Several formulations made according to this invention were evaluated by storing them for seven days at 72° F. These samples were then tested for microbiological activity and showed a coliform count of zero and a very low plate count. This use of a high sugar/water ratio to prevent spoilage is of great current interest in view of recent findings that some conventional preservatives, such as sodium nitrite, may be harmful to human health.

The foods of this invention are generally characterized by a high sugar content, usually at least equal in weight to the amount of water present in order to provide microbiological stability. The sugars used have a low molecular weight, being primarily dextrose and fructose, which comprise together at least about 50% and preferably at least about 75% of the total sugar content. Sucrose has a sweetness between that of fructose and dextrose. The fructose, which is sweeter than the dextrose, is preferred since it has a lesser tendency to crystallize and cause apparent hardness. For most foods, particularly where the food comprises an emulsion. It is preferred that the fats used, if any, include partially unsaturated fats which tend to provide superior flow properties and nutritional advantages although less stable than saturated fats. The fat content is usually less than the water content in order to form a stable oil-in-water emulsion; the water content is preferably at least about 25% greater than the fat content.

The high levels of sugar requisite to effect bacteriostasis may render the ultimate food product excessively sweet, however, and thus less palatable to some consumers. In accordance with this invention, it has been found that the addition of a bitterness principle modifies the undesirable sweetness of the sugar. More specifically, addition of a quinine salt, such as quinine sulfate, quinine bisulfate or quinine hydrochloride, results in reduced perception of sweetness. In many cases, the perceived sweetness is reduced by more than half the value associated with the unmodified food product. Quinine salts are employed in this regard in amounts up to about 125 p.p.m. per foodstuff. A preferred range of such additive amounts is from 2 to 75 p.p.m.

An important group of foods which has been particularly well-adapted in accordance with the present invention consists of the oil-in-water emulsions, including butter creams, whipped toppings, low-fat whipped creams, milk mates, non-dairy shakes, icings and coffee creamers.

Another class of goods, which forms a unique combination with the foregoing, is bakery products such as cakes, breads, cookies, pie shells, muffins, turnovers, pancakes, waffles and doughnuts. The pastries can be filled or topped with the creams and icings of this invention.

Many diverse foods can likewise be adapted pursuant to this invention, such as dressings, puddings, sauces, gravies, snack spreads, pancake syrups, ice creams, candies, and beverage (soup, tea, juice) concentrates, and meat, fish, fruit and vegetable products.

The foods of this invention are generally characterized by a water activity of about 0.75–0.90, up to about 0.93, a sugar to water ratio of about 1:1 and a sugar content which is at least 50% dextrose, fructose, or a combination thereof. In addition, many of the foods of this invention are adapted to remain spoonable or pourable at freezer temperature. Although most intermediate-moisture product will conventionally have a water activity below 0.85, some sacrifice in texture and taste may be required to meet this standard. Since the foods of this invention are maintained at freezer temperature until ready to be used, a water activity of 0.85–0.90, up to about 0.93, is adequate. Freezer temperatures of course are adequate to maintain the microbiological stability of foods and even moderate control of water activity is adequate to extend the useful life of these products after removal from the freezer. Freezer temperature, unless otherwise indicated, refers to temperatures of from about $-5°$ F. to $+10°$ F., which represents a common range for both home and store freezers.

The standard of being spoonable refers to the texture or flexibility of the product, as well as to the quality of being able to eat the food when it is at freezer temperature. The quality of being spoonable as used in this description is one which gives a satisfactory reading on a standard penetrometer and/or flow test, i.e, gave a penetrometer reading above about 3 mm.

The products of this invention having a penetrometer reading of about 3 mm or below are substantially non-crystalline, however, and become spoonable within a very short period of time upon removal from freezer temperatures and introduction to room temperature (about 72° F.), generally within about 5 to about 15 minutes. Such non-crystalline-type products can be used immediately in mixing, blending and various other food preparation procedures, although generally not considered quite flexible or soft enough for immediate consumption.

Pourable products of this invention are more fluid and are tested by flow characteristics, generally about 30 ml per minute and higher during the first five minutes after removal from the freezers.

The products, of this invention present highly significant results when compared to the standard, rock-hard frozen products currently on the market. Details of the testing procedures are specified below.

The water activities of the foods of this invention are usually about 0.75 to 0.90. Generally, the water activity is at the higher end of this range, i.e., about 0.85–0.90, up to about 0.93. Although microbiological stability is inversely proportional to water activity, several desirable properties of food are adversely affected at very low water activity, e.g., mouth-feel and taste. Since the foods of this invention are normally held at freezer temperatures for long-term stability, it is practical to formulate foods which have water activities nearer the borderline of microbiological stability, which is about 0.90–0.93.

Several mathematical methods are available for calculating water activity, even of formulations containing different solutes and with non-solutes. Rough calculations based on the additive effect of the number of moles of each component multiplied by the activity of the component are useful for estimating water activity. Such calculations reduce the number of experimental measurements that might otherwise be needed and thus assist in reaching a suitable formulation more quickly. A combination of mathematical techniques with trial and error experiments followed by analytical measurements for determining water activity will lead to acceptable results.

There are commercially available devices for measuring the water activity of formulations. For example, a formulation may be placed in a container until equilibrium is reached and then the humidity in the container measured. The water activity is then determined through reference to standard tables. For example, electric hygrometers are devices commonly used to measure water activity. These devices contain sensors impregnated with salts such as lithium chloride or potassium chloride. Water is adsorbed on the sensor and causes a change in electrical resistance which is measured by a wheatstone bridge. Reference curves based on solutions of known humidity are used to relate the electrical readings to water activity.

Throughout this application all amounts are by weight unless stated otherwise. In the examples the amounts have been adjusted to a basis of 100. Percentages are based upon total formulation weight, unless a different basis is given.

Many of the foods of this invention are generally characterized as microbiologically stable food products comprising about from 15 to 45% water, sugar in a ratio to water of about 1:1 to 2:1, preferably about from 1.5–1:1, and minor but effective amounts of salt, emulsifier, stabilizer and flavoring, provided that the foregoing comprises at least one of fructose and unsaturated fat, that the amount of fat, if any, is less than the amount of water or equivalent phase, such as non-aqueous water-soluble liquid phase, the solutes content is adequate to provide the product with a water activity of about from 0.8–0.9, up to about 0.93, the amount of dextrose plus fructose is at least about 50% based upon the total sugar content, and wherein the foregoing ingredients are adapted to provide a product which is substantially non-crystalline at freezer temperatures. Further, the foods of this invention may comprise up to about 125 p.p.m. of a quinine salt.

Certain other foods of the instant invention are characterized by the above general formulation exclusive of the restriction specifying that the ingredients comprise minor but effective amounts of salt, emulsifier and stabilizer, and the ratio to water of sugar. Other foods may comprise saturated fat, the total amount of fat comprising about from 2.5 to 30%.

A preferred class of foods is microbiologically stable oil-in-water emulsion cream-type products, such as butter creams, whipped creams, shakes, non-dairy creamers, etc., which comprise about from 25 to 45% water, sugar in a ratio to water of about from 1.5–1:1, about from 10 to 30% fat, and minor but effective amounts of protein, salt, emulsifier, stabilizer and flavoring, a water activity of about from 0.8 to 0.9, wherein the amount of fructose is about from 15 to 65% based on the sugar content and the amount of dextrose is at least about 50% based upon the remaining total sugar content, the fat content preferably contains at least about 10% unsaturated fat and the foregoing ingredients are adapted to provide a product which will flow at about 10° F. Such preparations may also comprise preferably about from 3 to 20 p.p.m. of a quinine salt. When the sugar component of the non-dairy creamer formulation is modified to contain only dextrose, a microbiologically stable food product is produced which remains semi-soft and substantially non-crystalline rather than spoonable at freezer temperature.

Still another preferred class of foods is microbiologically stable oil-in-water emulsion cream-type products, such as butter creams, whipped creams, shakes, non-dairy creamers, etc., which comprise about from 25 to 45% water, sugar in a ratio to water of about from 1.5–1:1, about from 10 to 30% fat, about from 2 to 40 p.p.m., preferably about from 3 to 20 p.p.m., of a quinine salt, and minor but effective amounts of protein, salt, emulsifier, stabilizer and flavoring, a water activity of about from 0.8 to 0.9, wherein the amount of fructose is about from 15 to 65% based on the sugar content and the amount of dextrose is at least about 50% based upon the remaining total sugar content, the fat content contains at least about 10% unsaturated fat and preferably, the foregoing ingredients are adapted to provide a product which will flow at about 10° F.

These oil-in-water emulsion products have excellent texture and eating properties and are readily whipped to a high volume with a light but firm structure. In addition to microbiological stability, these products have physical stability in that they retain a smooth foamed cellular structure without separation of a liquid portion. The products are further characterized by having an overrun of greater than about 150% and a density as low as about 0.3 or 0.4 for a butter cream and a whipped cream.

Another class of useful products is the flour-based foods. The batters for these products comprise conventional amounts and types of flour depending on the final product, about from 15 to 40% water, sugar in a ratio to water of about from 1.5–1:1, about from 2 to 10% or up to 25% fat, and minor but effective amounts of leavening agent which may be encapsulated, egg products, salt, emulsifier, stabilizer and flavoring, provided that the solutes content is adequate to provide the product with a water activity of about from 0.8 to 0.9, the fructose content of the sugar preferably is about 10 to 40%, the amount of dextrose plus fructose is at least about 50% or from 75 to 100% based upon the total sugar content, and the fat is preferably unsaturated. The batter should have at least one of fructose and unsaturated fat to assist in providing a spoonable and preferably a pourable product at about 10° F. The final product made from the batter has a higher penetrometer value than conventional products at 10° F. and is edible at that temperature. Such preparations may also comprise preferably about from 5 to 100 p.p.m. of a quinine salt.

A unique combination is prepared from a bakery product and a cream-type product, each made in accordance with this invention. Further, fruit (which may be infused with solutes) may be added to the bakery products and the cream-type products. The water activity of the bakery product and cream-type product when used in combination should be approximately the same, plus or minus 0.05 units, or up to 0.10 units deviation from each other. When the water activity values are comparable there is less of a tendency for water transfer as, for example, between a cake and its topping or filling.

Microbiologically stable soup concentrates and sauces have been made comprising about from 30 to 45% water, sugar in a ratio to water of about from 1.5–1:1, about from 5 to 30% fat, and minor but effective amounts of salt, stabilizer and flavoring, wherein the amount of dextrose plus fructose is at least about 50% based upon the total sugar content, the foregoing ingredients comprise at least one of fructose and unsaturated fat and the product is spoonable at about 10° F. Fish, meat and vegetables (which may be infused with solutes) are added to these to provide, for example, a chowder concentrate or newburg sauce. Such preparations may also comprise about from 5 to 100 p.p.m., preferably about from 30 to 70 p.p.m., of a quinine salt.

Microbiologically stable beverage concentrates, for example, tea, orange juice, etc., are made in accordance with this invention. They generally comprise about from 35 to 45% water, sugar in a ratio to water of about 1.8–2:1, and minor but effective amounts of flavoring, provided that the amount of fructose plus dextrose is about from 75 to 100% based on the total sugar content and the amount of fructose is about from 10 to 30% based upon the total sugar content, wherein the foregoing ingredients are adapted to provide a product which will flow at about 10° F. Such preparations may also comprise preferably about from 5 to 50 p.p.m. of a quinine salt.

Microbiologically stable pudding products have been made comprising about from 25 to 45% water, sugar in a ratio to water of about from 2–1:1, about from 3 to 25% fat, preferably unsaturated, and minor but effective amounts of gelling agent, emulsifier, stabilizer and flavoring, provided that the amount of dextrose plus fructose is at least about 75% of the total sugar content, wherein the foregoing ingredients are adapted to provide a product which is spoonable at about 10° F. Such preparations may also comprise about from 5 to 75 p.p.m., preferably 10 to 20 p.p.m., of a quinine salt. Fruit, which may be infused with solutes, may be added to the pudding products of this invention. Suitable pudding products include bread, rice, and plum pudding.

Microbiologically stable meat products, such as hotdogs, hamburgers, sausages and various meat loaves, are also made in accordance with this invention. Standard recipes for such products, known to those skilled in the art, are modified through this invention to contain (1) enhanced amounts of sugar, preferably fructose, in place of conventional sugar now used in amounts up to several times greater than those presently employed or (2) an infused solution of sugar in a ratio to water of at least 1:1, and, in either case, (3) fat in an amount less than the amount of water or equivalent phase, wherein the fat is substantially unsaturated, i.e., 50% or more, or preferably 75% or more of the fat is unsaturated. Furthermore, a quinine salt may be added in an amount not exceeding 125 p.p.m., and preferably falling within the range of 7 to 75 p.p.m. These modifications are incorporated in the compositions of such meat products to provide increased microbiological stability and thus extend the shelf-life of such goods.

The apparatus for measuring the flow characteristics of the products of this invention was fabricated from stainless steel and was essentially a stand 14"×12", with a movable platform of the same size to provide for vertical and angular adjustments. The platform was provided with a bulls-eye level and a protractor level; with the leading edge having a wire brace to retain the sample container.

The following method was used in obtaining the flow data. Graduated cylinders of 600 ml. capacity were filled with the samples and frozen for at least 24 hours at +5° F. The frozen samples were removed from the freezer, immediately placed on the platform in a horizontal (0°) position, and the effluent collected in other graduated cylinders, with the volume noted at timed intervals. Temperatures were monitored with a Honeywell recorder. Sample temperatures within the freezer varied from +4° F. to +7° F. over a four-week interval, but varied no more than 1° F. over an 8 hour period, while the temperature in the freezer varied from +15° F., each time the door opened. Room temperature varied about 2° F. for an average of 72° F., while the temperature of the samples in the original container rose anywhere from 1° F. to 14° F. during the 15 minutes after removal from the freezer.

The penetrometer test and equipment used are standard. The penetrometer is made by Labline Instrument Co. Inc., Chicago, Illinois. The device measures the penetration into the sample of the point of a hard rubber cone which weighs 12 grams and has a height of 1½" and a diameter of 1½" at its base. The inverted cone is supported by a freely-sliding bar which weighs 48 grams. For all measurements the sample was brought to a temperature of $-7°$ F. in a freezer and then removed from the freezer and immediately tested.

The products of this invention exhibited freeze-thaw stability in storage. The products were kept in a supermarket-type freezer unit which cycled six times a day between application of cooling to freeze the product and application of heat to defrost the unit. Under these conditions the products remained acceptable and functional.

The liquid emsulsions were examined by dipping a spatula in the emulsion, letting it drain and noting whether the residual film was smooth and uniform or whether particles were present, a condition denoting destabilization. These emulsions were also evaluated for their intended functional application.

The products passed the following test procedures:

(a) Whipped or aerated products were tested for volume (density) and the ability of the foam to remain stable—loss of volume due to air loss and/or for syneresis (separation of the water phase). This was applied to butter cream, toppings and shakes.

(b) The non-dairy creamer concentrates were tested in coffee for whitening ability, signs of free oil on the surface or curdled appearance, and presence of oil globules or curdling indicating emulsion breakdown.

(c) The semi-solid products which are consumed as such, e.g., pudding and cocktail sauce, were tested for syneresis and appearance (texture).

The method of making a microbiologically stable food product of this invention generally comprises mixing together about from 15 to 45% water, sugar in a ratio to water of about from 2-1:1, amount from 2.5 to 30% fat, and minor but effective amounts of salt, emulsifier, stabilizer and flavoring, provided that the amount of fat is less than the amount of water, the solutes content is adequate to provide the product with a water activity of about from 0.8 to 0.9, and the sugar comprises at least about 50% dextrose plus fructose; pasteurizing the mixture and cooling the resultant product. Up to about 125 p.p.m. of a quinine salt may also be employed in the mixing step.

A preferred method for preparing an emulsion product of this invention comprises blending all of the ingredients in the desired ratios. Usually most of the non-fat ingredients are first dispersed in the water. The ingredients are heated prior to or during blending. For example, the heating may begin during the mixing of the non-fat ingredients, and then the emulsifiers and fats are added. The fat portion may also be preheated and then admixed. The ingredients are pasteurized by holding at an elevated temperature for several minutes, i.e., at 180° F. for five minutes.

The blended ingredients are then passed through a homogenizer of the typical dairy type. Although homogenization may be accomplished in one stage, it is carried out in two stages for best results. Preferably, the pressure during the first stage is maintained at a minimum of about 2,000 psi and a maximum of about 10,000 psi, most preferably about 3,000 psi, and the pressure during the second stage is maintained at about 500 to 1,000 psi, preferably about 500 psi. The mix is usually maintained at a temperature of about from 60° to 75° C. during homogenization. The emulsion is cooled to a temperature of about from 0° to 25° C. and passed through a whipper for the incorporation of air or an inert gas such as nitrogen, carbon dioxide, nitrous oxide or the like. The whipper may be of conventional construction such as a Hobart mixer or an Oakes continuous mixer that permits cooling of the emulsion to temperatures of about 5° to 15° C., preferably 10° C., during whipping. The emulsion can be whipped to an overrun of from about 100% to 500% packaged and frozen.

Sugar is employed as the principal source of water soluble solids and typically may range in weight percentage of the composition anywhere from 30% to 60% depending upon the particular sugar and sugar mixture relied upon to offer the desired bacteriostatic protection. Lower amounts of sugar may be used if offset by increased levels of other solutes. As the moisture content of the product increases in the intermediate-moisture range, the level of a given sugar will generally correspondingly increase in order to maintain a sufficient bacteriostatic effect. The level of sugar chosen will also vary depending upon the pressure and level of auxiliary water soluble solids also offering a similar increase in osmotic pressure to the aqueous phase of the composition; thus, a variety of low average molecular weight materials may be included as part of the water soluble solids in the aqueous phase and will augment the sugars in their role of providing sufficient osmotic pressure to prevent bacterial decomposition.

The term "water soluble solids" is used to apply to any additive material which is substantially soluble in water at room temperature or at temperatures comparable to those practiced in processing the ingredients of the foods. Included in the class of water soluble non-sugar solids that can be employed are certain inorganic salts used at a level compatible with palatability requirements, e.g., sodium chloride and potassium chloride. Indeed, certain compounds like the diols and polyols, propylene glycol, sorbitol, glycerol and the like which have another function, i.e., as an antimycotic and/or texturizer, may also be relied upon to provide the soluble solids (or solutes) employed in the aqueous phase for bacteriostatic protection. Propylene glycol is prominent in this respect since it is capable of serving a multiple role as mold inhibitor, plasticizing humectant for texture, and component of the water soluble solids of the aqueous phase. The higher diols, such as the aliphatic 1,3-diols containing four to fifteen carbon atoms in the aliphatic chain and their esters which are completely metabolized, can also be used, particularly in conjunction with the foregoing sugars and sugar substitutes. These diols also assist in maintaining the foods in a bacteria-, yeast- and mold-free state while providing softness or plasticity to the formulations. These materials are stable, non-volatile oils with good storage and shelf life and appreciable water solubility, and can be readily emulsified and formulated into various food preparations.

The relative weight percent of said water soluble solids to the moisture content of the total product, when initially incorporated into the product during its manufacture and preparatory to packaging, determines the ultimate functionality of the solids in providing the requisite bacteriostatic effect. The level of water soluble solids may be varied as may the level of moisture initially incorporated within the aforesaid respective ranges. However, in varying these levels the relationship of water soluble solids in solution to the water should be controlled so as to afford the desired osmotic pressure. A good general rule to observe in this connection is to be sure that the weight of water soluble solids available for solution is at least equal to the weight of the moisture present, although in some cases it is possible that a lower level of water soluble solids might afford some protection against microbiological decomposition provided an equivalent degree of osmotic pressure is available. Generally, it will be found that the level of sugar that should be employed under the conditions of the present invention will constitute a major percent by weight of the water soluble solids.

Intermediate-moisture foods have a high sugar content which tends to promote nonenzymatic browning. This phenomenon is caused by complex reactions between the amino groups of proteins and the keto groups of sugars and is known as the Maillard Reaction. This nonenzymatic browning leads to undesirable darkening of the food product as well as off-odors and flavors. These reactions can also reduce the nutritional value of foods. Sugars such as dextrose are known to be capable of use at a lower level than sucrose to achieve an equivalent bacteriostatic effect but are reducing saccharides which are prone to undergo the undesirable Maillard-type reaction. Fructose is even more susceptible to the browning reaction. This reaction and other oxidative reactions are progressively retarded as the temperature is lowered from room temperature to refrigerator temperature to freezer temperature. Hence the products of this invention preferably are designed for usage at refrigerator and freezer temperature unlike the conventional intermediate-moisture foods which are stored and used at room temperature, and thus the foods of this invention can tolerate the large amounts of dextrose and fructose used.

The term "sugar" as it is employed in the present context is to be understood as meaning any of a number of useful saccharide materials which are capable of increasing the osmotic pressure of the water in which they are dissolved, thereby giving rise to the requisite bacteriostatic effect. Included in the list of useful sugars are the monosaccharides, disaccharides and polysaccharides and their degradation products; e.g., pentoses, including aldopentoses, methylpentoses, and ketopentoses, like xylose and arabinose; a deoxyaldose like rhamnose; hexoses and reducing saccharides such as aldohexoses like glucose, galactose and mannose; the ketohexoses, like fructose and sorbose; disaccharides, like lactose and maltose; non-reducing disaccharides such as a sucrose and other polysaccharides such as dextrin and raffinose; and hydrolyzed starches which contain as their constituents oligosaccharides. Typically, the commercially available mixtures of invert sugars are used which contain dextrose and levulose, as well as maltose and corn syrup solids. The sugars should be of a low molecular weight so as to offer a substantial effect in increasing the osmotic pressure of the sugar solution. The polyhydric alcohols may be used to replace a portion of the sugars used in this invention and are therefore encompassed by that term, i.e., from about 0.5 to 5% of the formulations may be a polyhydric alcohol such as glycerol and the like.

Since the product of this invention, when prepared in the manner herein disclosed, is characterized by its substantial resistance to bacterial decomposition, but may serve as a host for yeasts and mold, the foods of this invention may have an antimycotic agent incorporated at a level sufficient to prevent the growth of such organisms. Sorbate salts such as potassium sorbate, as well as sorbic acid can be used either separately or in combination. Propylene glycol, which may be used alone or with other humectants like sorbitol to impart a further degree of product softness or tenderness, can also serve as an antimycotic. Other antimycotic agents will be apparent to those skilled in the art. The amount of antimycotic agent added is selected so as to produce the desired results and will constitute only a minor proportion of the product, about 0.1% or higher, depending on the particular antimycotic and the particular product composition, although even lower levels, on the order of 50 p.p.m., can be employed in the case of such antimycotics as pimarcin. Potassium sorbate in a water solution can be sprayed onto the surface of the food or the food can be dipped in this solution; other antimycotics which lend themselves to such surface application are esters of the parabens (parahydroxy benzoate) such as propyl and methyl parabens (methyl para-hydroxy benzoate). Cellophane and other enwrapments for the food can be spray-coated with a sorbic acid solution, but impregnation or dusting with sorbic acid or potassium sorbate is preferred. Antimycotics which can generally be used are benzoic acid, sodium benzoate, propionic acid, sodium and calcium propionate, sorbic acid, potassium and calcium sorbate, propylene glycol, diethyl pyrocarbonate, and menadione sodium bisulfite (vitamin K).

Other ingredients known to those skilled in the art may also be employed to impart their characteristic effects to the compositions of the present invention. Typical of such ingredients are flavoring agents, colorants, vitamins, minerals, and the like. Suitable flavoring agents can be employed to impart vanilla, cream, chocolate, coffee, maple, spice, mint, butter, caramel, fruit and other flavors. Further, fruit which may not be infused with solutes, may be added to some products of this invention. In addition, certain polyols, such as sorbitol and mannitol, can be employed to modify mouthfeel. Furthermore, other additives, such as phosphates and the like, may be employed for their known functions. Several types of ingredients which can be employed are described below.

Fats high in unsaturation are safflower oil, corn oil, soybean oil, cottonseed oil and sunflower oil. Unsaturated fats as used in this specification are those having an iodine value of about at least 50 which include partially hydrogenated fats and the more highly unsaturated fats with an iodine value above about 100. These fats are recommended for dietary purposes, particularly for those people with a high plasma cholesterol level, a condition associated with atherosclerosis.

The saturated fats include the hydrogenated oil products of coconut, cottonseed, corn, soybean, peanut, olive, etc. Fats having a melting point of 90°–94° F. are preferred, i.e., the melting point should be below body temperature.

Emulsifiers are necessary ingredients of those compositions of the present invention which contain fats and are oil-in-water emulsions. A wide variety of emulsifiers may be employed in amounts on the same order as in the prior art oil-in-water emulsions, for example, about from 0.1–5%, and preferably about from 0.2–1.5%. They induce the formation of a stable emulsion and improve the rate of aeration and the total aeration obtained. Among the more suitable emulsifiers are: hydroxylated lecithin; mono-, di- or polyglycerides of fatty acids, such as monostearin and monopalmitin; polyoxyethylene ethers of fatty esters of polyhydric alcohols, such as the polyoxyethylene ethers of sorbitan monostearate (polysorbate 60) or the polyoxyethylene ethers of sorbitan distearate; fatty esters of polyhydric alcohols such as sorbitan monostearate; mono- and diesters of glycols such as propylene glycol monostearate, propylene glycol monopalmitate, and succinoxylated monoglycerides; and the esters of carboxylic acids such as lactic, citric, and tartaric acid with the mono- and diglycerides of fatty acids such as glycerol lacto palmitate and glycerol lacto stearate. The fatty acids employed in the preparation of the emulsifiers include those derived from beef, tallow, and coconut, cotton seed, palm, peanut, soybean and marine oils. Many blends of emulsifiers are commercially used and readily available in accordance with known techniques. For example, it may be desirable to provide a controlled hydrophil-lipophil balance (HLB) as with a lipophilic emulsifier such as glyceryl monostearate or sorbitan monostearate with a hydrophilic material such as polysorbate 60.

The emulsion compositions of the present invention also include one or more stabilizers or hydrophilic colloids to improve the body and texture of toppings, and as an aid in providing freeze-thaw stability. These stabilizers are natural, i.e., vegetable, or synthetic gums and may be, for example, carrageenin, guar gum, alginate, xanthan gum and the like, or methylcellulose (Methocel 65 HG), micro-crystalline cellulose and the like, or mixtures thereof. Typically, a gum or combination of gums is employed with a sugar, e.g., dextrose carrier. The amount of these stabilizers can be varied widely in accordance with the amounts required in prior art compositions, generally about from 0–2%, and preferably about from 0.1–0.5%.

Starches useful in this invention include the new and chemically modified starches from potato, arrow root, corn, rice, wheat, waxy maize, sorghum and waxy sorghum. Tapioca starch is particularly suitable for puddings. Generally about from 0.5 to 2.5% starch is adequate, although in the absence of stabilizers or in some puddings up to about 7% may be used.

Protein concentrates and isolates are useful in improving the nutritional qualities of the product and in facilitating and maintaining a whipped structure. Protein also aids in emulsification and contributes to flavor. Bland protein concentrates with a wide range of fiber content, bland soy flour, milk powder and food proteins are all useful, generally in concentrations about from 0–10%, and preferably about from 0.3–3%. Alternatively, use can be made of protein such as sodium or calcium caseinate, which is conventional in whipped toppings, or as its substitute, a protein hydrolysate in a minor amount.

Many types of salts are used in the compositions of this invention for flavoring, including common salt (sodium chloride), sodium or potassium phosphates, citrates, chlorides, and the like, in amounts about from 0–5%, but preferably about from 0.1–1%.

Antioxidants such as butylated hydroxytoluene, butylated hydroxyanisole and tertiary butyl hydroquinone may be used in minor amounts (i.e., Tenox 22 antioxidant).

Food grade acidulants such as phosphoric, tartaric, malic, citric, fumaric, hydrochloric and the like edible food acids are suitable to impart tartness, control pH or serve as preservatives.

The following are among the ingredients used in this invention:

The maize starch used is a highly modified waxy starch of amylopectin origin sold under the names (a) Amaizo Polar Gel 10 by American Maize-Products Co., New York, New York and (b) F-4-283 Starch by A. E. Staley Manufacturing Co., Decatur, Ill.

The fructose-dextrose syrup used in this invention ("Iso-sweet") comprises 29% water and 71% sugar (50% dextrose, 42% fructose, 1.5% maltose, 1.5% isomaltose and 5% higher saccharides). A high fructose-dextrose syrup contains 23.5% water, with the remaining proportion consisting of 55% fructose and 45% dextrose. A fructose concentrate is an aqueous syrup having 80% sugar, of which 90% is fructose and the remainder is dextrose.

Soy protein concentrate is prepared from soybean flakes which are extracted with a solvent system wherein the major protein fraction is immobilized and the water-soluble carbohydrates, mineral matter, and other minor constituents are removed. The extracted product is dried and ground. The concentrate is sold under the name Promsoy-100 by Central Soya. Whey protein concentrate is sold under the name Empro-50, and contains 53.6 parts protein and 26.5 parts lactose. A delactosed whey protein may also be used.

Soybean oil type 106 is a 100% soybean oil lightly hydrogenated to an iodine value of 106.

Hard butter type 106 is a blend of 45% palm kernel oil rearranged with 5% palm oil and 50% palm kernel oil hydrogenated to a Wiley Melting point of 106° F., and having a maximum iodine value of 1.5.

A standard mixture of mono- and diglycerides is used in many formulations. It is sold under the name Drewmulse 20 by PVO International, Inc., Boonton, N.J., and contains about 43% alpha mono content. It has an iodine value of 2.5, a melting point of 140° F. and is manufactured by the glycerolysis of animal or vegetable based fats.

Tenderex emulsifier is a mixture containing polysorbate 60 (11.9%), sorbitan monostearate (31.6%), mono- and diglycerides of fatty acids (2.3%), propylene glycol (9.5%) and water (44.3%).

The foregoing conventional ingredients may be used in their normal amounts and may vary from the representative amounts and ranges given herein. Food formulations and ranges of ingredients do not readily permit of fixed parameters because of variations in people and places. The following examples are not intended to be limiting, but rather illustrative of some approaches taken and, of course, which may be varied in accordance with the spirit and scope of this description.

EXAMPLE 1

The invention described herein for making microbiologically stable puddings (See Example 16) is also applicable for making donut fillings for pastries such as fruit pies, donuts, ets. Some fillings of this invention remain in a flowable condition at feezer temperatures so that they can be used directly upon removal from the freezer.

Each of the fillings, whether for fruit pies or for donuts, contains sugar in a ratio to water about from 0.8–1.5 to 1. The sugar is predominantly of low molecular weight—substantially dextrose and/or fructose in an amount totalling from about 50–100% of the total sugar content. The amount and form of the fruit used in the filling may vary widely.

The fillings preferably contain from about 40-60% fruit, from about 20-50% fructose-dextrose syrup, from about 5-25% additional sugar, from about 2-7% starch and from about 40-55% water. The fillings may also contain about from 2 to 30 p.p.m., preferably about from 3 to 20 p.p.m., of a quinine salt.

An example of an apple pie filling is:

| Ingredient | Amount |
|---|---|
| Frozen Apples | 50 |
| Dextrose-Fructose Syrup | 30.95 |
| Starch | 2.5 |
| Avicel (Cellulose Gum) | 0.5 |
| Dextrose | 5.51 |
| Sucrose | 10.0 |
| Salt | .1 |
| Cinnamon | .1 |
| Nutmeg | .05 |
| 50% Citric Acid | .3 |

5 p.p.m. of quinine sulfate may be added to the above composition.

In the foregoing composition the frozen apples comprise about 75% water, about 16% sucrose and about 8% fructose, and thus the total sugar content is almost 50% and the total water content is almost 47%.

EXAMPLE 2

An apple pie filling can also be made from the following formulation.

| Ingredient | Amount |
|---|---|
| Frozen Sliced Apples | 50.00 |
| Dextrose-Fructose Syrup | 36.14 |
| Sucrose | 10.04 |
| Starch | 3.00 |
| Cellulose Gel | 0.10 |
| Salt | 0.10 |
| Cinnamon | 0.10 |
| Nutmeg | 0.10 |
| Low Methoxy Pectin | 0.20 |
| Natural Flavor | 0.20 |
| Malic Acid | 0.02 |
| | 100.00 |

The total sugar content is almost 48%, about 60% of which is a combination of dextrose plus fructose. The total water content is about 48 to 50%. The apple filling is substantially noncrystalline at freezer temperatures, and about 5 to about 10 minutes after introduction at room temperature from freezer temperature is spoonable.

EXAMPLE 3

An example of an apple donut filling is as follows:

| Ingredient | Amount |
|---|---|
| (1) Dehydrated Apple Pieces | 11.40 |
| (2) Water | 33.34 |
| (3) Dextrose-Fructose Syrup | 50.36 |
| (4) Starch | 4.23 |
| (5) Salt | .08 |
| (6) Potassium Sorbate | .08 |
| (7) Cinnamon | .06 |
| (8) Nutmeg | .03 |
| (9) Ascorbic Acid | .02 |

| Ingredient | Amount |
|---|---|
| (10) Citric Acid Solution (50%) | .40 |
| | 100.00 |

The apple pieces are rehydrated in water (2) at about 140° F. Ingredients (3) through (9) are then mixed until uniform. The hydrated apple pieces are added to the mixture of ingredients (3) through (9), and the resulting mixture is cooked at 195° F. for about 5 to 10 minutes. The citric acid solution (10) is then added to the cooked mixture. The pH of the mixture should now be about 3.5 to about 3.7, and can be adjusted by addition of more acid if not at this level. The mixture is the cooled to 140° F., and then added to donuts or packaged for freezing.

The total sugar content of the above formulation is about 47%, and the total water content is about 48%.

EXAMPLE 4

An example of a donut filling is as follows:

| Ingredient | Amount |
|---|---|
| Dextrose-Fructose Syrup | 44.25 |
| Starch (Regista) | 5.537 |
| Lemon Powder | .051 |
| Salt | .113 |
| Potassium Sorbate | .1 |
| Red Dye No. 40 | .0175 |
| Cherries RSP, Grade A, Frozen | 49.53 |
| 50% Citric Acid | .4 |

5 p.p.m. of quinine sulfate may be added to the above formulation.

Frozen cherries were in conventional packed form containing five parts fruit to 1 part sucrose. These cherries contain about 70% water and the remainder is almost all fructose.

EXAMPLE 5

Another example of a donut filling is as follows:

| Ingredient | Amount |
|---|---|
| Water | 25.33 |
| Red Dyes | .0085 |
| Dextrose-Fructose Syrup | 51.0 |
| Dextrose | 6.00 |
| Sucrose | 10.0 |
| Black Raspberry Flavor | .1 |
| Premix | 7.56 |

5 p.p.m. of quinine sulfate may be incorporated in the above formulation.

The premix in the foregoing formulation contained:

| Sodium Alginate | 6.32 |
|---|---|
| Guar Gum | 2.97 |
| Sodium Hexametaphosphate | 3.53 |
| Dicalcium Phosphate | 2.23 |
| Adipic Acid | 8.16 |
| Sodium Benzoate | 1.68 |
| Sucrose (Extra Fine) | 60.3 |
| Starch | 14.85 |

EXAMPLE 6

A red raspberry donut filling can be made as follows:

| Ingredient | Amount |
| --- | --- |
| (1) Sucrose | 15.00 |
| (2) Starch | 1.4 |
| (3) Guar Gum | .28 |
| (4) Sodium Alginate | .6 |
| (5) Red and Blue Food Dyes | .05 |
| (6) Sodium Benzoate | .13 |
| (7) Dextrose-Fructose Syrup | 51.0 |
| (8) Flavorings | .05 |
| (9) Water (First Portion) | 21.74 |
| (10) Water (Second Portion) | 8.44 |
| (11) Adipic Acid | .77 |
| (12) Sodium Hexa-Meta-Phosphate (Water Conditioner) | .33 |
| (13) Dicalcium Phosphate Dihydrate | .21 |
| | 100.00 |

Ingredients (1) through (6) are mixed together until uniform. The dextrose-fructose syrup (7) is then added slowly to the mixture with agitation. The resulting mixture is then heated to 160° F. Flavorings (8) are added to the heated mixture, which is further mixed until all ingredients are completely dissolved. The first portion of water (a), approximately 21.74 which is heated to 140° F., is then added. The temperature of the then-resulting mixture is maintained between about 145° to 150° F. Ingredients (10) through (13) are then mixed to form a slurry, the water (10), approximately 8.44 being heated to 140° F. The slurry of ingredients (10) through (13) is then added to the above mixture maintained at between about 145° F. to 150° F., and the final formulation is mixed until uniform. The pH of the final formulation is about 4.1 to about 4.3. The final formulation is cooled, and incorporated into donuts or packaged.

The red raspberry donut filling comprises about 45% water, and about 51% sugar. About 60 to 70% of the total sugar content comprises dextrose plus fructose.

EXAMPLE 7

A Bavarian cream donut filling can be made as follows:

| Ingredient | Amount |
| --- | --- |
| (1) Water | 30.0 |
| (2) Whey Solids (72% Sugars) | 3.75 |
| (3) Titanium Dioxide | .03 |
| (4) Vanilla Shade 330 | .015 |
| (5) Starch | 4.75 |
| (6) Salt | .2 |
| (7) Sodium Stearyl-2-Lactylate | .1 |
| (8) Potassium Sorbate | .1 |
| (9) Dextrose-Fructose Syrup | 18.0 |
| (10) Phosphoric Acid (85%) | .045 |
| (11) Sucrose | 13.54 |
| (12) Pudding Emulsion (See Example 1) | 29.44 |
| | 100.000 |

Water (1), at 155° to 160° F., is added to a Norman Mixer, and then at low speed, is added ingredients (2) through (4). The blender is then turned to high speed and the ingredients are mixed until dissolved. At low speed, ingredients (5) through (8) are then added to the mixture, and, again, after all are added, the mixer is turned to high speed until all ingredients are dissolved. At low speed, the remaining ingredients (9) through (12) are added, and then mixed at high speed for five minutes. The resulting mixture is then cooked at 215° to 225° F. The cooked mixture is then cooled to 110° F. to 120° F. prior to packaging or incorporation into donuts.

The mixture, whether packaged or in donuts, should be held at room temperature (72° F.) for at least 4 hours before being placed in a freezer.

The above formulation comprises about 50% water, and about 36% sugar. The fat content is about 8%.

EXAMPLE 8

Another cream donut filling can be made as follows:

| Ingredient | Amount |
| --- | --- |
| (1) Water | 25.3 |
| (2) Dextrose-Fructose Syrup | 36.7 |
| (3) Bettercreme Premix* | 2.22 |
| (4) Sucrose | 10.6 |
| (5) Salt | 0.14 |
| (6) Polysorbate 60 | .27 |
| (7) Hexaglyceryl Distearate | .10 |
| (8) Hard Butter | 19.65 |
| (9) Soybean Oil | 4.89 |
| (10) Potassium Sorbate | .10 |
| (11) Artificial Flavoring | .03 |
| | 100.00 |

*Contains .26 methocel, 1.67 soy protein concentrate, .04 xantham gum and .55 dextrose.

Water (1), the dextrose-fructose syrup (2) and the bettercreme premix (3) are mixed. The mixture is heated to 180° F., during which heating ingredients (4) through (7) are added. The mixture is heated at 180° F. for five minutes, and then removed from heat and rapidly cooled to about 145° F. to about 155° F. Hard butter (8) and soybean oil (9) are then added, and potassium sorbate (10). The mixture is mixed for three minutes and then flavoring (11) is added. The mixture is homogenized first at 3000 psi, and then at 500 psi. It is then cooled.

The above formulation comprises about 36% water, about 37% sugar, and about 24% fat.

EXAMPLE 9

Another example of a doughnut filling is specified below:

| Ingredients | Amount |
| --- | --- |
| Water | 23.33 |
| Red Dyes | 0.0085 |
| Dextrose-Fructose syrup | 51.00 |
| Dextrose | 16.00 |
| Black Raspberry flavor | 0.10 |
| Premix | 7.56 |

5 p.p.m. of quinine sulfate is incorporated in the above formulation. The specified premix contains:

| | |
| --- | --- |
| Sodium alginate | 6.32 |
| Guar gum | 2.97 |
| Sodium hexametaphosphate | 3.53 |
| Dicalcium phosphate | 2.23 |
| Adipic acid | 8.16 |
| Sodium benzoate | 1.68 |
| Sucrose (Extra fine) | 60.30 |
| Starch | 14.85 |

The foregoing fillings are made by conventional techniques. For example, the cherry donut filling was made by first adding the dextrose-fructose syrup to a kettle. The starch (or other thickener) was mixed in with medium agitation until a uniform mixture was obtained.

The lemon powder, salt, potassium sorbate and red dye were added and the mixture was stirred until uniform. The cherries were defrosted and ground in a Fritz Mill with an 11/16" screen and added to the kettle. The formulation was cooked by raising its temperature to 195° and maintaining it at that point for 5–10 minutes. The citric acid solution, and the quinine salt, if added, were then added and the product was cooled at 140° F. The pH was maintained at 3.5–3.7.

EXAMPLE 10

Fruit may be added to all of the above formulations as desired. Further, the added fruit may be infused with solutes to control its water activity, i.e., to keep it at about 0.45 to about 0.65. For example, commercially available raisins, such as sultana, select, midget, golden or muscatel, may be infused by first pricking the raisins and then placing the pricked raisins in a warm bath of high fructose corn syrup (approximately 40 to 90% fructose, the corn syrup having sugar solids between about 70 to 80%). While the pricked raisins are in this bath, water is extracted from the raisins. The raisins are removed from the bath after being infused, and excess syrup is removed from the surface of the raisins by spin-drying. The raisins may then be lightly coated with an oil, such as cottonseed, corn or palm, and preferably with a saturated oil such as coconut, babasu or saturated corn, cottonseed, and palm.

Specifically, about 100 lbs. of raisins are passed through a pricking machine, which imparts 2 or 3 pricks to each raisin. The pricked raisins are then placed into a 500 lb. bath of high fructose syrup, having between about 70 to about 80% brix. The mixture is then heated to 150° F.

The raisins are kept suspended in the bath by slow mixing. An air current is sent through the bath to aid in keeping the raisins suspended in the bath, and to aid in the extraction of water from the raisins. The air current helps to maintain the brix of the syrup by aiding in extraction of water from the raisins. The rate of water extraction from the raisins is about equal to the rate of evaporation of water from the syrup bath. This operation is continued for about 8 to about 18 hours.

At the end of the bathing period, about 250 lbs. of fresh syrup is added, and mixed into the raisin bath to lower the viscosity thereof. The raisins are then removed from the bath by centrifuging in a basket centrifuge or a continuous decanter centrifuge, the separated syrup being separately recovered.

The infused raisins are then re-suspended in about 500 lbs. of saturated vegetable fat at 150° F., and mixed therewith using a high speed stirrer to produce heavy turbulence. This oil bath will remove any syrup sticking to the surface of the raisins.

The raisin-vegetable fat slurry is then centrifuged in a basket centrifuge or a continuous decanter centrifuge to separate the raisins from the vegetable fat. The fat is separately recovered for re-use.

Alternatively, the pricked raisins may be placed in a hot bath of fructose-containing syrup, at about 220° F. to 225° F., for a very short period of time, up to about 5 minutes, which will induce the removal of water from the pricked raisins by causing evaporation of the water from the raisins with consequent swelling thereof. The raisins and bath are then cooled to about 150° F., and maintained at that temperature for about a few hours, perhaps 1 to 2. As a second alternative, a sudden vacuum may be applied to the 150° F. bath of pricked raisins and fructose containing syrup, which vacuum conditions will induce removal of water from the pricked raisins and infusion of such raisins with sugars from the syrup bath. The vacuum conditions should be maintained for a few minutes or for a sufficient period of time to permit swelling of the raisins. These two alternatives eliminate the need for circulation of air through the raisin containing bath and also reduce the requisite period of infusion time.

The resulting raisins will have a water activity of between about 0.50 to about 0.55, and are soft. Further, in that the water content of the raisins is lowered, the raisins of this invention may be incorporated into cereals without substantially altering the water activity of the cereal flakes, which is also low. In present applications, the water activity of the flakes is raised upon incorporation of raisins having water activity of about 0.75, which incorporation produces soggy flakes. However, presently used techniques to lower the water activity of raisins result in hard, and commercially objectionable raisins.

Other fruit, of course, can be similarly infused. For example, dates, prunes, apricots, apples, peaches, pineapple, cherries, citron, among others, may be similarly treated. Furthermore, the infusion and lowered water activity may be achieved with solutes other than sugars, such as propylene glycol, glycerine and polyhydric alcohols such as sorbitol.

EXAMPLE 11

A newburg sauce can be made by the technique of this invention to be sold separately or with shell fish, such as lobster or crab. The fish may be treated to lower its water content by infusing it with stabilizing solutes to make it microbiologically stable at room temperature. However, since the product is kept frozen and can be used promptly after removal from the freezer, the requirements for microbiological stability are not as rigid as for conventional products.

The newburg sauce comprises about from 30 to 40% water, sugar in a ratio to water of about from 11.5 to 1, and about from 5 to 30% fat (saturated or unsaturated). The sugar content preferably includes about from 10 to 40% fructose, and the fructose plus dextrose content is about from 75 to 100% of the total sugar. The sauce also contains milk products (from whole and/or dry milk), salt, a stabilizer such as starch, and flavoring. In addition to milk products, other dairy products such as eggs or egg yolks may be added. And fats beyond those found in milk may be used, particularly unsaturated or partially saturated fats, such as margarine. The sauce may contain any of a number of other standard ingredients, each in conventional amounts which can be varied in accordance with known techniques.

The formulation for a crab newburg sauce follows.

| Ingredient | Amount |
|---|---|
| (1) Margarine | 3.06 |
| (2) Egg Yolk | 3.33 |
| (3) Lemon Juice Concentrate | .22 |
| (4) Whole Milk (87.34% Water) | 39.07 |
| (5) Corn Starch | 1.89 |
| (6) Salt | 1.11 |
| (7) Non-Fat Dry Milk | 6.88 |
| (8) Dextrose | 31.11 |
| (9) Fructose-Dextrose Syrup | 13.33 |
| | 100.00 |

The product contained 36.92% water and 40.57% sugar (3.97% fructose, 35.84% dextrose and 0.75% higher sugars). The milk products would contribute about an additional 5% sugar, but in the form of lactose which contributes comparatively little to lower the osmotic pressure.

The procedure for making this product is to dissolve the corn starch (5) and dry milk (7) in the whole milk (4) and add this to the melted margarine (1) and salt (6). This is heated and stirred until the mixture thickens. The egg (2) and lemon (3) are mixed and stirred into the thickened mixture. Infused crab (about from 30 to 40% of the total formulation) is added, with flavoring as desired, i.e., dry sherry wine and red pepper. The product is cooked for three to four minutes and the sugars (8) and (9) are added and mixed well for ten minutes.

The newburg sauce had a penetrometer value of 14.9 mm. A conventional frozen Alaska King Crab-Newburg Sauce (Stauffers) tested under the same conditions was too hard to give a measurable penetrometer reading.

Other sauces such as thermidor, bernaise, hollandaise and cheese may be made by the foregoing technique.

EXAMPLE 12

A yogurt type product, an acidophilus pudding, was made to have the properties of the pudding described in Example 12.

The acidophilus pudding comprises about from 25% to 40% water, sugar in a ratio of water from 2-1:1, and about from 3 to 15% fat. The amount of fructose and dextrose total about 50 to 100% of the sugar content.

A suitable formulation is:

| Ingredient | Amount |
| --- | --- |
| (1) Pudding emulsion | 50.00 |
| (2) Dextrose | 32.50 |
| (3) Sodium Alginate | .20 |
| (4) Fructose-Dextrose Syrup | 15.00 |
| (5) *Lactobacillus Acidophilus* Culture | 2.00 |
| (6) Calcium Chloride (10% sol'n) | .26 |
| (7) Butter Milk Flavor | .04 |
| | 100.00 |

The pudding emulsion (1) used as an ingredient was the same as that described in Example 12.

The product was made by premixing the dextrose (2), syrup (4) and sodium alginate (3), adding it to the pudding emulsion (1) at 150° F., cooling to 40° F. and adding the remaining ingredients (5) through (7). It comprised 28% water and 54.75% sugar.

The product was frozen overnight and immediately upon removal was found to be spoonable, whereas a conventional yogurt (Dannon) was hard and required defrosting before eating.

EXAMPLE 13

A gelatin-type pudding was made to have the properties of maintaining its texture at freezer temperatures and being microbiologically stable at room temperature.

The product comprises about from 40 to 50% water, sugar in a ratio to water about from 1-1.5 to 1, and a gel former. The sugar is of low molecular weight—substantially dextrose and/or fructose in an amount totaling about from 75 to 100% of the sugar content.

An example of a formulation is

| Ingredient | Amount |
| --- | --- |
| (1) Water | 49.40 |
| (2) Dextrose | 50.00 |
| (3) Sodium Alginate | .25 |
| (4) Color | .05 |
| (5) Flavoring | .05 |
| (6) Calcium Chloride (10% sol'n) | .25 |
| | 100.00 |

The product was made by premixing the dextrose and sodium alginate and adding it to the water which was heated to 150° F., after which the remaining ingredients were added.

The product was placed in a freezer overnight at −7° F. and immediately upon removal was spoonable, with a penetrometer reading of 10.3 mm. A conventional gelatin-type pudding (Jell-O brand) was hard and gave a reading of 0.7 mm under the same conditions.

EXAMPLE 14

A yogurt type product, an acidophilus pudding, made in accordance with the present invention is useful as a ready-to-eat convenience food which can be packaged in any conventionally used container for storage in a freezer; the pudding retains its soft texture at freezer temperature and is microbiologically stable at room temperature. Unlike canned puddings, the pudding of this invention does not require sterilization and expensive packaging and unused portions may be left in the refrigerator, or even at room temperature, for subsequent use. And, unlike conventional frozen puddings, the present pudding does not crystallize and harden with consequent loss of texture, nor is the inconvenience of defrosting necessary before the pudding can be eaten.

The acidophilus pudding comprises about from 25% to 45% water, sugar in a ratio of water from 2-1:1, and about from 3 to 15% fat. The amount of fructose and dextrose total about 50 to 100% of the sugar content. A quinine salt, up to about 125 p.p.m., may also be added.

A suitable formulation is:

| Ingredient | Amount |
| --- | --- |
| (1) Pudding emulsion | 50.00 |
| (a) water | 23.93 |
| (b) polysorbate 60 | .15 |
| (c) guar gum | .05 |
| (d) sorbitan monostearate | .10 |
| (e) sodium caseinate | .65 |
| (f) dextrose | .50 |
| (g) sucrose | 11.10 |
| (h) hard butter | 4.00 |
| (i) coconut oil | 9.5 |
| (j) potassium sorbate | .02 |
| | 25.77 |
| (2) Dextrose | 32.50 |
| (3) Sodium Alginate | .20 |
| (4) Fructose-Dextrose Syrup | 15.00 |
| (5) *Lactobacillus Acidophilus* Culture | 2.00 |
| (6) Calcium Chloride (10% sol'n) | .26 |
| (7) Butter Milk Flavor | .04 |
| | 100.00 |

The pudding emulsion (ingredients (a) through (j)) is a conventional product made by heating the water (a) to 140° F., adding the remaining ingredients, heating the solution to 155° to 160° F., homogenizing in two steps at 7000 and 500 psi and cooling to 34°-38° F.

The product was made by premixing the dextrose (2), syrup (4) and sodium alginate (3), adding it to the pudding emulsion (1) at 150° F., cooling to 40° F. and adding the remaining ingredients (5) through (7), and the quinine salt, if any. It comprised 28% water and 54.75% sugar.

The product was frozen overnight and immediately upon removal was found to be spoonable, whereas a conventional yogurt (Dannon) was hard and required defrosting before eating.

Fruit may be added to the yogurt pudding product, which fruit may be infused with solutes. Suitable fruit would include strawberries, cherries, blue berries and raspberries, among others. Approximately 2 to about 15% of the pudding product may be such added fruit.

EXAMPLE 15

A cocktail sauce for shrimps was made to have the characteristics of remaining edible at freezer temperature and of being microbiologically stable at room temperature. The shrimps themselves may be made in accordance with the technique of infusing fish products with a high solutes contents to impart microbiological stability and tenderness at freezer temperatures.

The sauce of this invention comprises about from 35 to 45% water, sugar in a ratio to water of about from 1–1.5:1. The sugar comprises substantially dextrose and fructose as 75 to 100% of the total sugar content. The fructose content may be about from 10 to 30% of the sugar content. Further, about from 30 to 70 p.p.m. of a quinine salt may be added. In addition, conventional ingredients such as ketchup (or other tomato product), horseradish, salt and flavoring are added.

A sauce of the following composition was made.

| Ingredient | Amount |
| --- | --- |
| (1) Ketchup | 41.877 |
| (2) Water | 10.10 |
| (3) Horseradish | 4.90 |
| (4) Starch (Instant) | .75 |
| (5) Lemon Juice Concentrate | .31 |
| (6) Salt | 1.92 |
| (7) Black Pepper | .003 |
| (8) Hot Sauce | .27 |
| (9) Dextrose | 23.92 |
| (10) Fructose-Dextrose Syrup | 15.95 |
| | 100.00 |

50 p.p.m. of quinine sulfate may be added to the above composition.

The ketchup has about 68.0% water and 12% sugar—such as sucrose. The sauce is made by mixing together ingredients (1) through (8) until uniform. The mixture is then heated to 160° F. and held at that temperature while mixing in the dextrose (9) and syrup (10) at medium speed for 10 minutes. Three parts of the sauce to one part of treated shrimp are mixed together for the final product.

The shrimp may be treated to lower its moisture content below 50% and to add solutes comprising sugars, polyhydric alcohols and salts to lower the water activity of the shrimp to 0.90 and below, i.e., to 0.75. This can be carried out by cooking or subsequently immersing the shrimp in a stabilizing solution having a concentration of water soluble compounds sufficiently high to effect the desired transfer of solute and lowering of water activity—usually under an elevated temperature and pressure. For example, in one procedure the shrimps were placed in the following solution, which was brought to boiling temperature and then let stand at room temperature overnight.

| Ingredient | Amount |
| --- | --- |
| Water | 47.4 |
| Propylene Glycol | 44.3 |
| Sodium Chloride | 7.4 |
| Potassium Sorbate | 0.9 |

These shrimps were placed in the freezer overnight and when removed were soft and ready to eat. An alternative procedure is to use the same technique with a shrimp flavored fructose-dextrose syrup having about 5 to 10% salt.

The cocktail sauce had a penetrometer reading of 22.4 mm. A conventional frozen cocktail sauce (Kitchens Of The Oceans, Inc.—Dearfield Beach, Florida) tested under the same conditions gave a penetrometer value of 6 mm.

The effect of the quinine salt addition in the above example is a reduction in the sweetness of the food product as perceived upon ingestion of the foodstuff. In many cases, the decreased perception of sweetness associated with the quinine-imbued food product is on the order of 50% of that of the unmodified composition. Addition of quinine substances to food products to lessen the perceived sweetness of such compounds is postulated to be achieved through masking of the excessive sweetness occasioned by the sugar through the inherent bitterness of the quinine substance. It is further believed that this bitterness reduces the duration of perceived sweetness by altering the manner in which the sweetness of the sugar is physiologically perceived. This theory is offered solely by means of explanation, however, and is not intended to limit the scope of the above invention exclusively to this theory.

EXAMPLE 16

Puddings made in accordance with the present invention are useful as a ready-to-eat convenience food which can be packaged in any conventionally used container for storage in a freezer; the pudding retains its soft texture at freezer temperature and is microbiologically stable at room temperature. Unlike canned puddings, the pudding of this invention does not require sterilization and expensive packaging and unused portions may be left in the refrigerator, or even at room temperature, for subsequent use. And, unlike conventional frozen puddings, the present pudding does not substantially crystallize with consequent loss of texture, nor is the inconvenience of a long period of thawing necessary before the pudding can be eaten.

The puddings of this invention generally comprise an oil-in-water emulsion having about from 30 to 40% water, sugar in a ratio to water of 1–1.5 to 1 and about from 15 to 25% fat. When the sugar does not contain fructose and the fat is saturated, the product tends to a somewhat cohesive consistency and the sugar to water ratio is maintained toward the upper range. The amount of dextrose plus fructose is preferably about 70 to 100% of the sugar content. The use of unsaturated fats, such as soybean oil, would be desirable for flow and nutritional properties. Minor amounts of conventional stabilizers, emulsifiers and flavors are also used. Further, about from 10 to about 30 p.p.m. of a quinine salt may be added.

A pudding was made from the following ingredients in the indicated amounts.

| Ingredient | Amount |
| --- | --- |
| (1) Pudding emulsion | 66.29 |
| (a) water | 31.72 |
| (b) polysorbate 60 | .20 |
| (c) guar gum | .07 |
| (d) sorbitan monostearate | .13 |
| (e) sodium caseinate | .86 |
| (f) dextrose | .66 |
| (g) sucrose | 14.72 |
| (h) hard butter | 5.30 |
| (i) coconut oil | 12.60 |
| (j) potassium sorbate | .03 |
|  | 66.29 |
| (2) Dextrose | 33.14 |
| (3) Sodium Alginate | .23 |
| (4) Vanilla Flavor | .11 |
| (5) Calcium Chloride (10% Solution) | .23 |
|  | 100.00 |

Quinine sulfate may be added to the above composition in the amount of 15 p.p.m.

The pudding emulsion (ingredients (a) through (j)) is a conventional product made by heating the water (a) to 140° F., adding the remaining ingredients, heating the solution to 155° to 160° F., homogenizing in two steps at 7000 and 500 psi and cooling to 34°-38° F. The pudding formulation of this invention was made by premixing the dextrose (2) and sodium alginate and adding them to the standard pudding emulsion at 150° F., the remaining ingredients, (4) and (5), and quinine sulfate, if any, are then added.

The product had a slightly elastic character and at −7° F. a penetrometer value of 29.3 mm, compared to a commercially available pudding (Rich's Chocolate Pudding) which gave a penetrometer reading of 1.3 mm. The water activity of the pudding averaged 0.852 at 72° F.

EXAMPLE 17

A gelatin-type pudding was made to have the properties of maintaining its texture at freezer temperatures and being microbiologically stable at room temperature.

The product comprises about from 40 to 50% water, sugar in a ratio to water about from 1-1.5 to 1, and a gel former. The sugar is of low molecular weight—substantially dextrose and/or fructose in an amount totaling about from 75 to 100% of the sugar content.

An example of a formulation is

| Ingredient | Amount |
| --- | --- |
| (1) Water | 49.40 |
| (2) Dextrose | 50.00 |
| (3) Sodium Alginate | .25 |
| (4) Color | .05 |
| (5) Flavoring | .05 |
| (6) Calcium Chloride (10% sol'n) | .25 |
|  | 100.00 |

The product was made by premixing the dextrose and sodium alginate and adding it to the water which was heated to 150° F., after which the remaining ingredients were added.

The product was placed in a freezer overnight at −7° F. and immediately upon removal was spoonable, with a penetrometer reading of 10.3 mm. A conventional gelatin-type pudding (Jell-O brand) was hard and gave a reading of 0.7 mm under the same conditions.

EXAMPLE 18

A microbiologically stable cake batter and cake and other bakery products were made which retain their characteristic texture at freezer temperature. The cake batter is suitable for industrial and home use where stable storage is an important factor. The batter can be kept in a freezer and is always ready for use. The cake of this invention is particularly suited for the expanding convenience frozen food market. It can be cut and served promptly upon removal from the freezer. The cake, of course, can be made with fillings and toppings described above which likewise retain a soft texture and are microbiologically stable.

The cake batter comprises about from 20 to 30% water, sugar in a ratio to water of about from 1-1.5:1, and preferably about from 2.5 to 10% fat, and up to 25% fat. The sugar preferably includes fructose in an amount about from 10 to 40% based on the sugar content with the remainder being substantially dextrose (50-100%). The type of fat can be varied widely between saturated and unsaturated depending on the type of cake and texture desired. An unsaturated fat will provide superior flow and nutritional properties. Other conventional ingredients are used in their normal proportions such as egg whites, nonfat milk solids, flour, emulsifiers or softeners such as glyceryl monostearate, salt, preservative, coloring and flavoring.

A cake batter was made from the following:

| Ingredient | Amount |
| --- | --- |
| (1) Water | 15.0 |
| (2) Egg White (88% water) | 8.75 |
| (3) Sugar (12x) | 8.75 |
| (4) Dextrose | 18.75 |
| (5) Fructose-Dextrose Syrup | 15.0 |
| (6) Tenderex emulsifier | 1.4 |
| (7) Baking Powder | 1.3 |
| (8) Vegetable Oil | 2.5 |
| (9) Vanilla | .2 |
| (10) Salt | .72 |
| (11) Coloring | .13 |
| (12) Nonfat milk solids | 2.5 |
| (13) Cake Flour | 25.0 |
|  | 100.00 |

The water content of the batter is 27.67% and the sugar content is 38.15% (fructose 4.47%, dextrose 24.08% and other sugars, 9.6%).

The water (1), egg whites (2), and sugars (3 through 5) are mixed thoroughly. The emulsifiers (6), baking powder (7), vegetable oil (8) and vanilla (9) are added and mixed in until uniform. The remaining ingredients (10 through 13) are then mixed in.

The batter was frozen and then tested on a penetrometer; it had a value of 19.8 compared to a conventional batter which gave a reading of 4.1. A cake made from this batter was frozen and it gave a penetrometer reading of 6.9 compared to a value of 4.2 for a conventional cake. The cake had a moisture content of 25.2%.

The cake was topped with a butter cream made by the procedure of Example 22. The finished cake was placed in the freezer for a day and then removed. The topping and cake retained their texture and could be eaten immediately.

EXAMPLE 19

A further formulation was developed for a cake batter which was particularly adapted for sale from supermarket freezers for the ultimate consumer who would bake and consume the product. This batter has excellent flow properties at freezer temperatures. It can be used immediately upon removal from the freezer and then whatever batter remains can be returned to the freezer for storage. The product lacks conventional chemicals, preservatives, and emulsifiers found in cakes since the batter is designed for use by the ultimate consumer who will make and, without any great interval of time, consume the cake. The batter of this formulation, has the additional optional advantage of making a cake which will retain its soft and edible texture at freezer temperature. This batter is also suitable to make other products, such as pancakes and the like.

The batter comprises about from 20 to 40% water, preferably from 25 to 30% water, sugar in a ratio to water of about from 1-1.5:1, and about from 5 to 25% fat, preferably about from 8 to 12% fat. The sugar content preferably includes fructose in an amount about from 10 to 40%, with the remainder being substantially dextrose, i.e. about 50 to 100% of the remainder.

The batter formulation was as follows:

| Ingredient | Amount |
| --- | --- |
| (1) Water | 10.3 |
| (2) Egg White (88% Water) | 10.0 |
| (3) Dextrose | 9.7 |
| (4) Fructose-Dextrose Syrup | 30.0 |
| (5) Baking Powder | 2.0 |
| (6) Vegetable Oil | 10.0 |
| (7) Vanilla | .1 |
| (8) Salt | .4 |
| (9) Nonfat Milk Solids | 2.5 |
| (10) Cake Flour | 25.0 |
| | 100.0 |

The water content of the batter is 25.4% and the sugar content is 31% (fructose 8.95%, dextrose 20.35% and other sugars 1.7%). The product was made by the procedure of Example 7. The batter was frozen and then tested for its flow properties with the following results (obtained at the indicated temperatures): 190 ml. at 1 minute (10° F.), 425 ml. at 3 minutes (20° F.), 480 ml. at 5 minutes (22° F.) and 575 ml. at 10 minutes (28° F.).

EXAMPLE 20

A milk mate product was prepared in accordance with this invention. It is adapted to be maintained in a freezer without hardening so that upon removal it can be mixed immediately and readily with milk. Since the milk mate remains soft, it can be spooned into milk and stirred to prepare a thick drink. The milk mate can be formulated with a vitamin mix which is stabilized by maintaining the product in the freezer.

The milk mate product is an oil-in-water emulsion comprising about from 25 to 40% water, sugar in a ratio to water of about from 1-1.5:1, and from about 10 to 25% fat. The fat content is preferably at least 50% and up to 100% unsaturated to provide better flow properties and greater nutrition. The sugar preferably comprises some fructose such as about from 15 to 65% of the total sugar content, and the amount of fructose plus dextrose equals about from 50 to 100% of the sugar. A minor but effective amount of vitamins in any standard mix may also be added in addition to conventional ingredients such as: flavoring (cocoa, vanilla), emulsifiers, salt and stabilizers.

The milk mate product can be mixed in varying amounts with milk, for example, about from 20 to 100 parts of milk mate to 200 parts of cold milk.

An example of a milk mate product is:

| Ingredient | Amount |
| --- | --- |
| (1) Water | 21.26 |
| (2) $K_2HPO_4$ | .14 |
| (3) Sodium Acid Pyrophosphate | .02 |
| (4) Soy Protein Isolate | .50 |
| (5) Sucrose | 20.96 |
| (6) Dextrose-Fructose Syrup | 30.05 |
| (7) Cocoa | 6.99 |
| (8) Salt | .50 |
| (9) Polysorbate 60 | .30 |
| (10) Sodium Stearoyl-2 Lactylate | .30 |
| (11) Mono and Di-Glycerides | .40 |
| (12) Soybean Oil | 17.97 |
| (13) Potassium Sorbate | .10 |
| (14) Vanilla | .01 |
| (15) Color | .20 |
| (16) Vitamin Mixture | .30 |
| | 100.00 |

This product has 30.40% water (including the water from the syrup and vitamin mix) and 42.30% sugar. The vitamin mixture was ⅔ water and the remainder a mixture of vitamins A, $B_1$, $B_2$, $B_6$, C, D and E.

The procedure to make the milk mate was as follows: Melt the emulsifiers (9–11) in a container and add them to the soybean oil which was heated to 120° F.—and hold until ready to use. Heat the water to 150° F. in a kettle and add ingredients 2 through 8. Add the oil-emulsifier blend to the remaining ingredients and mix for one minute. Homogenize at 3000 and 500 psi and cool to 40° F.

The product had a water activity of 0.88, measured at 72° F. The product flowed readily after storage in a freezer. The flow test results were: 55 ml. in one minute, 230 ml. in 5 minutes and 365 ml. in 15 minutes—by which time the product reached 16° F.

The product mixed well with cold milk immediately upon removal from the freezer. A drink was made with 30 gms. of the milk mate and 210 gms. cold milk. The flavor and body were good, and remained so after being held at 40° F. for four days.

EXAMPLE 21

A non-dairy shake similar to a milk shake was prepared which at freezer temperature was free flowing and soft both before and after whipping. Moreover, it could be whipped without first defrosting it. The shake can be made with a variety of flavors and like the other products of this invention is microbiologically stable.

The shake comprises about from 35 to 45% water, sugar in a ratio to water of 1-1.5:1, and 3 to 10% fat. The sugar comprises a substantial amount of fructose and based on the total sugar content, the fructose content is about from 15 to 65%, preferably 20 to 50%. The remaining sugar is substantially dextrose, i.e., 50 to 100% of the remaining sugar, preferably the total amount of fructose plus dextrose is about from 75 to 100% of the sugar content. The fat content is preferably about from 50 to 100% unsaturated. The product also contains a whey protein concentrate or other protein concentrate to improve whipping properties and nutritional values, conventional amounts of stabilizers, such as xanthan gum or cellulose esters, salts, emulsifiers, and flavoring are also used.

The following is a suitable formulation for a shake:

| Ingredient | Amount |
|---|---|
| (1) Water | 30.00 |
| (2) High Fructose-Dextrose Syrup | 52.29 |
| (3) Xanthan gum | .04 |
| (4) Methocel 65 HG | .26 |
| (5) Sucrose | 1.87 |
| (6) Dextrose | 2.40 |
| (7) Whey protein concentrate | 8.00 |
| (8) Polysorbate 60 | .28 |
| (9) Hexaglyceryl Distearate | .10 |
| (10) Soybean Oil | 4.50 |
| (11) Lecithin | .10 |
| (12) Salt | .10 |
| (13) Vanilla | .05 |
| (14) Strawberry Flavor | .01 |
| | 100.00 |

The product has a total water content of 42.29% and a sugar content of 46.39% (22% fructose, 20.4% dextrose and 3.99% other sugars, based on the total composition).

The product is made by mixing the syrup (2) with cold water (1) and adding in a premix of ingredients 3 to 5 with stirring until completely dissolved. The solution is heated to 180° F. and ingredients 6 through 9 are added and dissolved, after which the solution is held at that temperature to 5 minutes. A warmed blend of the soybean oil and lecithin are added and then the remaining ingredients, and mixing is continued for one minute. The product is homogenized at 3,000 and the 500 psi and finally cooled to 40° F.

The product was placed in a freezer for 24 hours and upon removal was found to remain very fluid—it has a flow rate of 600 ml. in 30 seconds.

The product after whipping also had excellent flow properties at freezer temperatures—460 ml. after one minute, 545 ml. after three minutes. A conventional milk shake (McDonald's) was tested under the same conditions but failed to flow at all over a fifteen minute period. When dextrose was substituted for the high fructose-dextrose syrup in the formulation of this example the whipped product at 5° F. would not flow even after 15 minutes. But when one-half of the syrup was replaced by an equal weight of dextrose, the whipped product showed some flow—up to five minutes no flow, 25 ml. after 10 minutes, 35 ml. after 12 minutes and 60 ml. after 15 minutes.

EXAMPLE 22

A group of useful products made in accordance with this invention is the oil-in-water emulsion based material used for preparing butter creams, whipped creams, shakes, coffee lighteners, and the like. Butter cream, which can be used as a topping and/or filling for a confectionary product, is typical in several respects of this class of products and the manner in which the problems raised by this type of product have been overcome can readily be adapted to similar types of products.

The conventional butter cream used as a topping or filling by the bakery industry is essentially made of 10–35% shortening, 40–60% sugar, 2–12% water and 1–2% milk powder and/or other emulsions. The creams have poor storage capability and cannot be maintained long at room temperature or even under refrigerated conditions for too long. Because of the inherent limitations in the basic ingredients in the system, it is not feasible to whip in the required amount of air to get the desired mouth feel and texture. Regular butter cream with a specific gravity of 0.6 to 0.75 leaves a greasy feeling in the mouth. Another defect of the butter cream, is the excessive sweetness due to the very high percentage of sugar in the water phase of the product. The high sugar to water ratio also causes a sandy or gritty mouth feel. Butter creams are used in many types of confectionary products which are stored at freezer or re temperatures, but when a cake decorated with butter cream is frozen, the butter cream becomes hard and has a tendency to crack, peel off, and lead to slipping when used between layers of cake. Similar problems are encountered with conventional butter creams at refrigerator temperatures. A cake with butter cream, when subjected to a normal room temperature of about 70° F. leads to weeping and sagging of the butter cream.

The butter cream, made according to this invention, does not have the above mentioned limitations. The following are some of the features of this product:

It is an oil-in-water type emulsion and can be pasteurized, unlike the conventional butter cream;

The product can be whipped to a specific gravity of about 0.3 to 0.4 and has a very desirable mouth feel and texture;

The whipped product has almost 50% less calories per unit volume because of its lower specific gravity compared to the regular butter cream sold in the trade;

The cost of the whipped product per unit volume is also comparably less than the conventional butter cream;

The product made according to this invention has enhanced stability against microbiological spoilage even when stored at room temperature during the normal shelf life of the baked item, because of the high osmotic pressure exerted by the sugar blends used at the specific concentration in the water phase;

Unlike ordinary butter cream, the consistency of this product can be adjusted by judicious blending of oils so that it can be pumped and whipped in a continuous serator;

The product's flexibility in consistency also is advantageous in enabling the product to be shipped in tank wagons, which leads to substantial savings in unit packaging and handling;

The type and amount of fat and the sugar blend in this product lead to a product with a marshmallowy texture;

The formulation is compatible with the incorporation of protein concentrate which contains 5–6% crude fiber, which results in an increase in nutritional value in the product and gives special flavor and texture to the product;

The product has the flexibility of permitting replacement of up to 60% of the saturated fat with polyunsaturated fat where special dietary requirements are necessary;

An outstanding feature of the product is that it stays essentially unfrozen or spoonable when used as a filling or topping in a frozen baked product. This keeps the product in a ready-to-eat texture even in the freezer. This also eliminates the normal cracking or peeling of the butter cream in the freezer, and prevents the normal moisture transfer between the cake and its filling which causes sogginess and provides a media for microbial growth after thawing;

The product may be made completely of ingredients of vegetable origin but, if desired, there is flexibility for usage of ingredients of animal origin; and Since the butter cream remains fluid at freezer temperature it can be immediately handled and whipped, unlike conventional formulations which are first brought up to room temperature, then whipped, and finally brought back down to refrigerator or freezer temperatures.

The butter cream is an oil-in-water emulsion comprising about from 25 to 45% water, preferably 30–40% water, sugar in a ratio to water of about from 1–1.5:1 and about from 10 to 30% fat. At the higher ratios, particularly of fructose a less firm product is obtained which is less suited as a topping but may be used as a filling, i.e. in an eclair. The sugar preferably comprises some fructose, usually in an amount about from 15 to 65% based on the total sugar used. The remainder of the sugar is at least substantially dextrose, i.e. from at least about 50% up to all of the remaining sugar, preferably the total amount of fructose plus dextrose is about from 75 to 100% of the sugar content. The fat preferably contains about from 10 to 60% unsaturated or partially unsaturated fat. Minor amounts of other ingredients are used in about conventional amounts, i.e. protein concentrate, salt, emulsifier, stabilizer and flavoring.

An example of a useful formulation follows.

| Ingredient | Amount |
| --- | --- |
| (1) Water | 25.32 |
| (2) Dextrose-Fructose Syrup | 36.72 |
| (3) Xanthan Gum | .04 |
| (4) Sucrose | .26 |
| (5) Methocel 65 HG | .26 |
| (6) Soy Protein concentrate | 1.67 |
| (7) Dextrose | 10.57 |
| (8) Salt | .14 |
| (9) Polysorbate 60 | .28 |
| (10) Hexaglyceryl Distearate | .1 |
| (11) Hard Butter | 19.5 |
| (12) Soybean Oil | 5.0 |
| (13) Lecithin | .1 |
| (14) Tenox 22 antioxidant | .01 |
| (15) Flavoring | .03 |
| | 100.00 |

The procedure for making the butter cream formulation was as follows: The sweetener (2) was added to the water (1) and mixed. Components (3) through (6) were premixed and added to the batch and mixed in. Heating of the batch to 180° F. was begun during which the dextrose (7) and salt (8), polysorbate 60 (9) and hexaglyceryl distearate (10) were added. After 180° F. was reached mixing was continued for 5 minutes. Then all but 0.3 parts of the hard butter (11) and all the soybean oil (12) were added. The lecithin (13) and tenox (14) were dissolved in the remaining butter and the mixture was added. The flavoring (15) was then mixed in the mixture and homogenized in two steps at 3000 and 500 psi and the product cooled to 38°–42° F. The finished product can be packed in suitable containers, and stored in a freezer or refrigerator for whipping later.

The water content of the formulation was 35.97% (including the water in the dextrose-fructose syrup). The formulation also contained 10.95% fructose, 23.61% dextrose and 2.35% higher sugars (36.91% total sugar). The product was whipped and had an overrun value of 2.86, with a whipping time of about 4 minutes. The specific gravity of the product was 0.35.

The coli count after five days at room temperature was less than ten and the total plate count at that time was less than one hundred—which shows an excellent room temperature stability. It was found that freshly made samples decreased in coli count upon storage at room temperature and had lower counts than refrigerated samples, which in turn had lower counts than frozen samples, i.e. freshly made samples had a coli count of 152. Three samples were held for fourteen days at the indicated temperatures and then had the following coli counts:

| Temperature | Coli Count |
| --- | --- |
| 70° F. | 7 |
| 40° F. | 53 |
| −7° F. | 133 |

The product was left standing for ten days at room temperature without any evidence of browning (Maillard reaction).

The water activity of the whipped product was 0.875 at 72° F. and its pH was 6.88. It was found that as the sugar/water ratio fell below about one the product quickly lost is microbiological stability and physical integrity. Thus, even at about 45% sugar in the aqueous phase, the coli count and the total plate count increased within two days at room temperature and the butter cream sagged.

This formulation has excellent flow properties at 5° F.—the flow test results were: 300 ml. after 1 minute, 455 ml. after 3 minutes and 570 ml. after 6 minutes. The product when whipped was easily applied to cake as a topping and maintained its physical integrity, texture, and appearance in the freezer during a ten-day test and at room temperature during a seven day test. The butter cream was capable of being whipped at freezer temperatures it was whipped at a temperature as low as minus 30° F.

EXAMPLE 23

The techniques described above may be modified to make ice cream, ice milk, french custard, sherbert and similar products. The ice cream product can remain soft in the freezer so that it can be used immediately upon removal from the freezer.

The ice cream products comprise about 45% to 60% water, sugar in a ratio to water of about from 0.5–1:1, and fat about from 8 to 16%. The total of fructose and dextrose is from about 75 to 100% of the total sugar content, the amount of fructose preferably is 65 to 100% of the total sugar content. The fat is a butter fat.

For non-regulated ice-cream substitutes (where the ingredients can be varied without Government regulation) the water content may be about from 40 to 60%, the sugar to water ratio may be about 0.5 to 1.5:1, fat about from 2 to 16%. The amount of fructose plus dextrose equals about 50 to 100% of the sugar content.

The following is a suitable ice-cream formulation:

| Ingredients | Amount |
| --- | --- |
| (1) Whole Milk | 40.00 |
| (2) Fructose Concentrate* | 26.88 |
| (3) Heavy Cream | 24.62 |
| (4) Non-Fat Dried Milk | 7.00 |
| (5) Sucrose | .70 |
| (6) Sodium and Calcium Alginate | .30 |
| (7) Polysorbate 60 | .10 |

| Ingredients | Amount |
| --- | --- |
| (8) Sorbitan Monostearate | .10 |
| (9) Vanilla | .30 |

*This product is an aqueous syrup having 80% sugar, of which 90% is fructose and the remainder dextrose.

The product had a water content of 54.12%, a sugar content of 28.7% (including the sugars in the whole milk, cream, and milk solids) and a fat content of 10.26% (from the milk and cream).

The procedure for making the product was to add the cream and milk to a kettle and begin heating. When 140° F. was reached, the emulsifiers (7 and 8) were added. While stirring, a premix of the sucrose (5) and alginate (6) were added, and then fructose concentrate (2) and milk solids (4). Mixing was continued at 160° F. for five minutes. The product was then homogenized in a first stage at 3000 psi and second stage at 500 psi followed by cooling. The product was whipped to an overrun of 100% and removed at 22° F. This ice-cream was placed in a freezer at about 0°–10° F. for 72 hours and during this entire period, it retained a texture suitable for immediate use. The maintenance of this spoonable texture also permits the ice cream to be packaged in a flexible squeeze package (i.e. a Squiggle-Pak) for dispensing in a ribbon form.

EXAMPLE 24

An ice cream product made in accordance with the present invention remains soft in the freezer so that it can be used immediately upon removal from the freezer.

The ice cream product comprises about 45 to 60% water, sugar in a ratio to water of about from 0.5–1:1, and from about 8 to 16% fat. The total of fructose and dextrose is from about 75 to 100% of the total sugar content, the amount of fructose preferably is 65 to 100% of the total sugar content. The fat is a butter fat.

For non-regulated ice-cream substitutes (where the ingredients can be varied without government regulation) the water content may be about from 40 to 60%, the sugar to water ratio may be about 0.5 to 1.5:1, fat about from 2 to 16%. The amount of fructose plus dextrose equals about 50 to 100% of the sugar content.

The following is a suitable ice-cream formulation:

| Ingredient | Amount |
| --- | --- |
| (1) Whole Milk | 40.00 |
| (2) Fructose Concentrate* | 26.88 |
| (3) Heavy Cream | 24.62 |
| (4) Non-Fat Dried Milk | 7.00 |
| (5) Sucrose | .70 |
| (6) Sodium and Calcium Alginate | .30 |
| (7) Polysorbate 60 | .10 |
| (8) Sorbitan Monostearate | .10 |
| (9) Vanilla | .30 |

*This product is an aqueous syrup having 80% sugar, of which 90% is fructose and the remainder dextrose.

The product had a water content of 54.12%, a sugar content of 28.7% (including the sugars in the whole milk, cream and milk solids) and a fat content of 10.26% (from the milk and cream).

The procedure for making the product was to add the cream and milk to a kettle and begin heating. When 140° F. was reached, the emulsifiers (7) and (8) were added. While stirring, a premix of the sucrose (5) and alginate (6) were added, and then fructose concentrate (2) and milk solids (4). Mixing was continued at 160° F. for five minutes. The product was then homogenized in a first stage at 3000 psi and second stage at 500 psi followed by cooling. The product was whipped to an overrun of 100% and removed at 22° F. This ice-cream was placed in a freezer at about 0°–10° F. for 72 hours and, during this entire period, it retained a texture suitable for immediate use. The maintenance of this spoonable texture also permits the ice cream to be packaged in a flexible squeeze package (i.e., a Squiggle-Pak) for dispensing in a ribbon form.

EXAMPLE 25

Illustrative of the oil-in-water emulsion based products made in accordance with this invention is a non-dairy creamer which can be stored in a freezer until ready for use, thawed, and then used or left at room temperature for at least aout ten days without spoilage. The product may also be left in a refrigerator for a lengthy period of time without spoilage. This product is useful as a coffee lightener and sweetener.

The coffee lightener contains about from 35 to 45% water, dextrose in a ratio to water of about from 1.5–1:1, about from 10 to 30% fat and about from 3 to 20 p.p.m. of a quinine salt. The fat content preferably comprises from 50 to 100% unsaturated type fats. Other ingredients are included in conventionally minor amounts, such as salts, emulsifiers and a protein concentrate.

An example of a suitable formulation is:

| Ingredient | | Amount |
| --- | --- | --- |
| (1) | Water | 40.00 |
| (2) | $K_2HPO_4$ | 0.14 |
| (3) | $Na_2HPO_4$ | 0.14 |
| (4) | Sodium acid pyrophosphate | 0.02 |
| (5) | Soy protein isolate | 0.50 |
| (6) | Polysorbate 60 | 0.30 |
| (7) | Sodium stearoyl lactylate | 0.30 |
| (8) | Mono- and Diglycerides | 0.40 |
| (9) | Potassium sorbate | 0.10 |
| (10) | Dextrose | 40.10 |
| (11) | Soybean | 16.00 |
| (12) | Coconut Oil | 2.00 |
| | | 100.00 |

Quinine sulfate is added to the above composition in the amount of 7 p.p.m.

The product was made as follows:

Heat the coconut oil to 155° F. and dissolve in the emulsifiers, ingredients 6–9. The foregoing is then added to the soybean oil. The water is heated to 150° F. and the salts 2 through 4 and protein 5 are added. The dextrose 10 is added to the aqueous solution, which is then held at 170° F. for one minute, after which the oil blend is added. The quinine sulfate is then added. The entire batch is homogenized at 3,000 and then at 500 psi and cooled to 40° F.

This product does not flow, but is a semi-solid when held at 5° F. for three days. This formulation has a water activity value of 0.9 measured at 72° F., and upon storage at 40° F. for thirty-two days, maintained its stability and did not exhibit any off-flavor. In addition, the product maintains its stability at room temperature for many days.

EXAMPLE 26

The above formulation for a non-dairy creamer may be modified to contain dextrose as the sole sugar constituent. The resultant product can be stored in a freezer until ready-for-use, thawed, and then used or left at room temperature or refrigerator temperature for a lengthy period of time without spoilage.

The creamer contains about from 35 to 45% water, dextrose in a ratio to water of about from 1.5–1:1, and about from 10 to 30% fat. The fat content preferably comprises from 50 to 100% unsaturated type fats. Other ingredients are included in conventionally minor amounts, such as salts, emulsifiers, and a protein concentrate.

An example of a suitable formulation is:

| | Ingredient | Amount |
|---|---|---|
| (1) | Water | 40.00 |
| (2) | $K_2HPO_4$ | 0.14 |
| (3) | $Na_2HPO_4$ | 0.14 |
| (4) | Sodium acid pyrophosphate | 0.02 |
| (5) | Soy protein isolate | 0.50 |
| (6) | Polysorbate 60 | 0.30 |
| (7) | Sodium Stearoyl Lactylate | 0.30 |
| (8) | Mono- and Diglycerides | 0.40 |
| (9) | Potassium sorbate | 0.10 |
| (10) | Dextrose | 40.10 |
| (11) | Soybean | 16.00 |
| (12) | Coconut Oil | 2.00 |
| | | 100.00 |

The product was made as follows:

Heat the coconut oil to 155° F. and dissolve in the emulsifiers, ingredients 6–9. The foregoing is then added to the soybean oil. The water is heated to 150° F. and the salts 2 through 4 and protein 5 are added. The dextrose 10 is added to the aqueous solution, which is then held at 170° F. for one minute, after which the oil blend is added. The entire batch is homogenized at 3,000 and then at 500 psi and cooled to 40° F.

This product does not flow, but is a semi-solid when held at 5° F. for three days. This formulation has a water activity value of 0.9 measured at 72° F., and upon storage at 40° F. for thirty-two days, maintained its stability and did not exhibit any off-flavor. In addition, the product maintains its stability at room temperature for many days.

EXAMPLE 27

A non-dairy coffee creamer was made which can be stored in a freezer until ready for use, and then immediately used or left at room temperature for at least about ten days without spoiling until used. The product may also be left in a refrigerator for a lengthy period of time without spoilage. This product is useful as a coffee lightener and sweetener.

The coffee lightener comprises about 35 to 45% water, sugar in a ratio to water of about from 1–1.5:1, about from 10 to 30% fat. The sugar content may be all dextrose, but from 15 to 55% of the sugar content may be fructose with the remainder being substantially dextrose. Preferably the total of the fructose and dextrose is about from 75 to 100% of the sugar. The fat preferably comprises from 50 to 100% unsaturated type fats. Other ingredients are included in conventionally minor amounts, such as salts, emulsifiers and a protein concentrate.

An example of a suitable formulation is:

| | Ingredient | Amount |
|---|---|---|
| (1) | Water | 23.72 |
| (2) | $K_2HPO_4$ | .14 |
| (3) | $Na_2HPO_4$ | .14 |
| (4) | Sodium acid pyrophosphate | .02 |
| (5) | Soy protein isolate | .50 |
| (6) | Polysorbate 60 | .30 |
| (7) | Sodium Stearoyl Lactylate | .30 |
| (8) | Mono and Di-Glycerides | .40 |
| (9) | Fructose-Dextrose Syrup | 56.48 |
| (10) | Soybean | 16.00 |
| (11) | Coconut Oil | 2.00 |
| | | 100.00 |

The product contains a total of 40.1% water and 40.1% sugar (which includes 16.84% fructose, 20.05% dextrose and 3.21% higher sugars).

The product was made as follows:

Heat the coconut oil to 155° F. and dissolve in the emulsifiers, ingredients 6 through 8; the foregoing is added to the soybean oil. The water is heated to 150° F. and the salts 2 through 4 and protein 5 are added. The syrup 9 is added to the aqueous solution, which is then held at 170° F. for one minute, after which the oil blend is added. The entire batch is homogenized at 3,000 and then 500 psi and cooled to 40° F.

The product's flow characteristics at freezer temperatures were zero flow at one minute, 20 ml. at three minutes, 220 ml at five minutes and 600 ml at seven minutes. The same formulation in which dextrose replaced the fructose did not flow but was a semi-solid when held at 5° F. for three days.

The formulation given above had a water activity value of 0.9 measured at 72° F., and upon storage at 40° F. for thirty-two days maintained its stability and did not exhibit any off-flavor. The product also maintains its stability at room temperature for many days.

EXAMPLE 28

Frozen clam chowder concentrate as presently marketed is usually defrosted before use. Otherwise, it is difficult to remove from the can and if removed from the can and placed while still solid in boiling water or a hot pot it sinks to the bottom of the pot and may be scorched. In accordance with the present invention a clam chowder concentrate can be made which will flow at freezer temperature. This product is easily removed from its container and mixed with water or milk to make the final product.

The clam chowder concentrate contains from about 30 to about 45% water, sugar in a ratio to water of about from 1–1.5:1, and about from 5 to 30% fat (saturated or unsaturated). The sugar content preferably includes about from 10 to 40% fructose and the fructose plus dextrose content is about from 75 to 100% of the total sugar. The formulation includes a standard mixture of finely chopped vegetables, a stabilizer like cornstarch, salt, spices, and flavorings. Other conventional ingredients can be added, such as milk solids.

A clam chowder concentrate was made from the following ingredients in the amounts listed.

| | Ingredient | Amount |
|---|---|---|
| (1) | Margarine | 7.32 |
| (2) | Potato (finely chopped) | 4.05 |
| (3) | Celery (finely chopped) | 5.03 |
| (4) | Onion (finely chopped) | 2.81 |
| (5) | Mushrooms (finely chopped) | 2.23 |

| Ingredient | Amount |
|---|---|
| (6) Garlic (finely chopped) | .07 |
| (7) Cornstarch | 1.31 |
| (8) Stewed tomatoes | 22.68 |
| (9) Salt | .23 |
| (10) Black Pepper | .03 |
| (11) Worcestershire Sauce | .78 |
| (12) Sherry Wine | .78 |
| (13) Fructose-Dextrose Syrup | 20.05 |
| (14) Dextrose | 32.63 |
| | 100.00 |

The product is made by melting the margarine (1) and adding the vegatables, (2) through (6), to saute' them. Alternatively the vegatables can be infused with solutes to control their stability and texture, e.g., cooking or subsequently immersing the vegetables in a stabilizing solution having a concentration of water soluble compounds sufficiently high to effect the desired transfer of solute. The salt (9) and pepper (10) are added. Separately dissolve the cornstarch (7) in the stewed tomatoes (8), add to the saute'ed mixture and simmer until thickened. The worcestershire sauce (11) and sherry (12) are added and simmering is continued for five to seven minutes. Add the desired amount of infused clams (i.e., about 25%) and simmer for five minutes more. Infused clams are those treated to lower their moisture content below 50% and to add solutes comprising sugars, polyhydric alcohols and salts to lower the water activity of the clams to about 0.90 and below, i.e., to 0.75. This can be carried out by cooking or subsequently immersing the clams in a stabilizing solution having a concentration of water soluble compounds sufficiently high to effect the desired transfer of solute and lowering of water activity—usually under an elevated temperature and pressure. For example, in one procedure the clams were placed in the following solution which was brought to boiling temperature and then let stand at room temperature overnight.

| Ingredient | Amount |
|---|---|
| Water | 47.4 |
| Propylene Glycol | 44.3 |
| Sodium Chloride | 7.4 |
| Potassium Sorbate | 0.9 |

These clams were placed in the freezer overnight and when removed were soft and ready to eat. An alternative procedure is to use the same technique with a clam-flavored fructose-dextrose syrup having about 5 to 10% salt. Finally add the sugars (13) and (14), and mix for ten minutes.

This product had a moisture content of 42.03% and a sugar content of 46.95%. The clam chowder concentrate gave a penetrometer reading of 3.9. A conventional frozen oyster stew semi-condensed soup (Campbell's) tested under the same conditions gave a penetrometer reading of zero, i.e., too hard for penetration.

The product can be frozen until ready to be used. It is then readily dispersed in water or preferably milk and heated. The foregoing formulation and technique can be readily adapted to make other soup concentrates, such as a seafood bisque, and cream of chicken, mushroom, cheese and other fish, fowl, meat and vegetables.

EXAMPLE 29

Orange juice and iced tea concentrates were made which maintained fluidity at freezer temperatures and are microbiologically stable. These products overcame the difficulties of removing solid concentrates from cans and dispersing them in water.

The juice and tea concentrates comprise about from 35 to 45% water, sugar in a ratio to water of from about 1.2 to about 1.8:1. The sugar comprises substantially, i.e., 75% to 100%, a mixture of fructose and dextrose. The fructose content is from about 10 to 30% of the total sugar content.

An orange juice concentrate was made as follows.

| Ingredient | Amount |
|---|---|
| (1) Dextrose | 37.00 |
| (2) Fructose-Dextrose Syrup | 33.00 |
| (3) Citric Acid | .20 |
| (4) Oil of Orange | .15 |
| (5) Water | 29.65 |
| | 100.00 |

The water (5) was heated to 160° F. and held at that temperature while mixing in dextrose (1). The syrup (2), citric acid (3) and oil of orange (4) were then blended into the prepared mixture.

The concentrate was placed in a freezer and afterwards tested for its flow properties with the following results: no flow after 1 minute, 125 ml after 3 minutes; 145 ml after 5 minutes; 230 ml after 10 minutes; and 245 ml after 15 minutes. A conventional orange juice concentrate (Awake) even after 15 minutes was still solid with less than 1 ml flow.

When the above formulation was modified by replacing the syrup with an equal weight of dextrose the product upon freezing gave zero flow at 10 minutes and 15 ml flow after 15 minutes.

The concentrate of the above formulation makes an orange juice drink when mixed with an equal amount of water. Quinine salts may be added thereto up to about 75 p.p.m., and preferably about from 5 to 50 p.p.m.

EXAMPLE 30

Another orange juice concentrate can be made as follows.

| Ingredient | Amount |
|---|---|
| (1) Dextrose-Fructose Syrup | 65.77 |
| (2) Orange Juice Concentrate (64% Brix)* | 23.77 |
| (3) Anhydrous Citric Acid | 3.00 |
| (4) Starch | 2.02 |
| (5) Xanthan Gum | 0.25 |
| (6) Natural Orange Flavor | 0.15 |
| (7) Water | 5.04 |
| | 100.00 |

*64% sugars, about half sucrose and half fructose.

Ingredients (1) through (7) are mixed and blended.

EXAMPLE 31

An iced tea concentrate was made from the following.

| Ingredient | Amount |
|---|---|
| (1) Dextrose | 37.00 |
| (2) Fructose-Dextrose Syrup | 33.00 |

-continued

| Ingredient | | Amount |
|---|---|---|
| (3) Citric Acid | | .03 |
| (4) Oil of Leron | (1 drop) | .27 |
| (5) Tea Brew | | 29.70 |
| | | 100.00 |

The product was made by boiling 325 grams water and steeping the tea (5 bags–25 grams) for 3–4 minutes to make the tea brew (5). The brew was brought to 160° F. and the dextrose (1) added. Then the syrup (2), citric acid (3) and oil of lemon (4) were mixed in.

The product was frozen and tested for flow characteristics, with the following results: 475 ml after 1 minute, 500 ml after 3 minutes, and 525 ml after 5 minutes. A conventional tea concentrate (Nestea Reconstituted) gave less than 5 ml flow after 15 minutes when frozen. When the syrup (2) is replaced by an equal amount of dextrose, the frozen product shows no flow through 15 minutes. Furthermore, quinine salts may be added to the above iced tea concentrate up to about 75 p.p.m. and preferably about from 5 to 50 p.p.m.

EXAMPLE 32

Another iced tea concentrate can be made from the following.

| Ingredient | | | Amount |
|---|---|---|---|
| (1) Dextrose | | | 14.450 |
| (2) Fructose-Dextrose Syrup | | | |
| | (a) | water 12.126 | |
| | (b) | fructose 21.711 | |
| | (c) | dextrose 17.763 | 51.600 |
| (3) Anhydrous Citric Acid | | | 0.412 |
| (4) Spray Dried Lemon Flavor | | | 1.650 |
| (5) Instant Tea | | | 0.928 |
| (6) Water | | | 30.960 |
| | | | 100.00 |

Ingredients (1) through (6) are mixed to form the concentrate.

EXAMPLE 33

A product having wide commercial application is sugared egg yolks. Such product is used in commercial bakeries, and by manufacturers of baby foods. The sugared yolk product, which is subject to government regulation, contains egg yolks, sugar, water and up to about 1% of additives such as stabilizers. However, upon freezing, present sugared yolk products become rock-hard, and must be thawed before such products can be employed in the preparation of other food products, e.g., the sugar yolk product is too hard for immediate introduction into blenders and mixers. The period needed to permit thawing of present sugared yolk products, in addition to being an annoyance, provides an opportunity for contamination of the sugared yolks and for microbial growth.

In accordance with the present invention a sugared yolk product was made which will remain non-crystalline at freezer temperature. This product, accordingly, will be immediately available for use by the food industry in that it can be introduced into mixers and blenders without a thawing period. Furthermore, within about 5 to 10 minutes from introduction of this product to room temperature, it will be spoonable.

The sugared yolk formulation comprises about 45 to 85% egg yolks, and preferably about 55 to 70% egg yolks, about 10 to 30% sugar, about 5 to 10% water and up to about 1% of a protein stabilizer. The sugar used is substantially, 75% or more, dextrose plus fructose. The water activity of the sugared yolk product of this invention will be from about 0.85–0.90, up to about 0.93.

A sugared yolk formulation was made from the following ingredients in the indicated amounts.

| Ingredients | Amount |
|---|---|
| (1) Dextrose | 8.38 |
| (2) Fructose-Dextrose Syrup | 30.26 |
| (3) Egg Yolk | 60.52 |
| (4) Stabilizer | 0.84 |

Egg yolks are about 55% water, about 25 to 30% fat, about 15% protein, and miscellaneous minerals, vitamins and other substances. The above formulation contains about 40% water and about 32% fructose plus dextrose.

Ingredients (1) through (4) are mixed at low speed for about 2 to 3 minutes. After a homogeneous blend is obtained, the mixture is whipped at high speed for about 3 to 5 minutes.

The formulation is non-crystalline at freezer temperatures. After about 5 to 10 minutes at room temperature, the formulation is spoonable.

EXAMPLE 34

Sour cream and sour cream-based products normally must be consumed fairly soon after purchase because of their short shelf life, even at normal refrigerator temperatures of 40° F. to 50° F. It is difficult to freeze these products because of the formation of ice crystals within the product which tend to break down its structure and texture. Various substitutes have been developed for these sour cream products but none has been completely acceptable in texture and stability.

In accordance with the present invention, a sour cream dressing was made which will remain spoonable at freezer temperature and which is microbiologically stable at room temperature. Since this product must have a sour taste it is desirable to reduce and preferably eliminate the sweetest sugar (fructose) in the formulation, and preferably to use an unsaturated fat.

The sour cream dressing formulation comprises about from 30 to 40% water, sugar in a ratio to water about from 1–1.5 to 1 and about from 10 to 30% fat, preferably about from 15 to 25% fat. The sugar used is substantially all dextrose, with up to about 10% of the formulation being fructose and up to about 10% of the formulation being other sugars. A high ratio of sugars to water should be used to contribute to the fluidity of the formulation at low temperature when fructose is not used. The fat used may be saturated or unsaturated, but preferably from half to all of the fat is unsaturated. A minor amount of acid is used, such as about 1 to 2% or more to provide some tartness to the formulation which has a sweet flavor from the sugar present. Other conventional ingredients are used in their normal amounts such as salt, stabilizers and emulsifiers; see for example U.S. Pat. No. 3,729,322.

A sour cream dressing formulation was made from the following ingredients in the indicated amounts.

| Ingredients | | Amount |
|---|---|---|
| (1) | Dextrose | 44.14 |
| (2) | Water | 31.88 |
| (3) | Maize Starches | 1.72 |
| (4) | Non-Fat Dry Milk | 2.87 |
| (5) | Sodium Stearoyl-2 Lactylate | .49 |
| (6) | Xanthan Gum | .25 |
| (7) | Sodium and Calcium Alginate | .25 |
| (8) | Titanium Dioxide | .10 |
| (9) | Dipotassium Phosphate | .39 |
| (10) | Salt (NaCl) | .20 |
| (11) | Soybean Oil-Type 106 | 15.83 |
| (12) | Adipic Acid | .20 |
| (13) | Citric Acid | .10 |
| (14) | Sorbic Acid | .05 |
| (15) | Lactic Acid | .35 |
| (16) | Vinegar (110 grain) | .68 |
| (17) | Polaks Flavor #540191 | .50 |
| | | 100.00 |

The procedure to make the product was as follows: measure hot tap water in Norman Blender; add pre-blend and mix for 3 minutes (the pre-blend contained all of the dry materials); add soybean oil, flavor, acids, and vinegar; mix for 10 minutes at high speed; use a double-barrel votator to cook to 190°–200° F. for approximately 5 seconds; homogenize at 2000 psi first stage and 500 psi second stage; use the same twin-shell votator (swept surface cooker-cooler) to cool to 60° F.; fill in containers and freeze.

At −5° F. the product was spoonable. The freezer flow test showed: virtually no flow at 3 minutes; 2 ml. at 5 minutes; 4 ml. at 10 minutes and 6 ml. at 15 minutes. A penetrometer test at freezer temperature gave a value of 25.2 mm; whereas a commercially available control sample (Rich's sour) gave a penetrometer reading of 1.3 mm. Thus the sour cream dressing can be used immediately upon removal from the freezer with a softness and flowability for easy application to other foods or for direct eating.

EXAMPLE 35

Sour cream and sour cream-based products normally must be consumed fairly soon after purchase because of their short shelf life, even at normal refrigerator temperatures of 40° F. to 50° F. It is difficult to freeze these products because of the formation of ice crystals within the product which tend to break down its structure and texture. Various substitutes have been developed for these sour cream products but none has been completely acceptable in texture and stability.

In accordance with the present invention, a sour cream dressing was made which will remain spoonable at freezer temperature and which is microbiologically stable at room temperature. Since this product must have a sour taste it is desirable to reduce and preferably eliminate the sweetest sugar (fructose) in the formulation, and preferably to use an unsaturated fat.

The sour cream dressing formulation comprises about from 30 to 40% water, sugar in a ratio to water of about from 1–1.5 to 1 and about from 10 to 30% fat, and preferably about from 15 to 25% fat. The sugar used is substantially all dextrose, with up to about 10% of the formulation being fructose and up to about 10% of the formulation being other sugars. A high ratio of sugars to water should be used to contribute to the fluidity of the formulation at low temperature when fructose is not used. The fat used may be saturated or unsaturated, but preferably from half to all of the fat is unsaturated. A minor amount of acid is used, such as about 1 to 2% or more to provide some tartness to the formulation which has a sweet flavor from the sugar present. Further, a quinine salt may be added, up to about 125 p.p.m., and preferably from about 2 to about 75 p.p.m. Other conventional ingredients are used in their normal amounts such as salt, stabilizers and emulsifiers; see, for example, U.S. Pat. No. 3,729,322.

A sour cream dressing formulation was made from the following ingredients in the indicated amounts.

| Ingredients | | Amount |
|---|---|---|
| (1) | Dextrose | 44.14 |
| (2) | Water | 31.88 |
| (3) | Maize Starches | 1.72 |
| (4) | Non-Fat Dry Milk | 2.87 |
| (5) | Sodium Stearoyl-2 Lactylate | .49 |
| (6) | Xanthan Gum | .25 |
| (7) | Sodium and Calcium Alginate | .25 |
| (8) | Titanium Dioxide | .10 |
| (9) | Dipotassium Phosphate | .39 |
| (10) | Salt (NaCl) | .20 |
| (11) | Soybean Oil-Type 106 | 15.83 |
| (12) | Adipic Acid | .20 |
| (13) | Citric Acid | .10 |
| (14) | Sorbic Acid | .05 |
| (15) | Lactic Acid | .35 |
| (16) | Vinegar (110 grain) | .68 |
| (17) | Polaks Flavor #540191 | .50 |
| | | 100.00 |

The procedure to make the product was as follows: measure hot tap water in Norman Blender; add pre-blend and mix for 3 minutes (the pre-blend contained all of the dry materials); add soybean oil, flavor, acids, and vinegar; mix for 10 minutes at high speed; use a double-barrel votator to cook to 190°–200° F. for approximately 5 seconds; homogenize at 2000 psi first stage and 500 psi second stage; use the same double-barrel votator (swept surface cooker-cooler) to cool to 60° F.; fill in containers and freeze.

At −5° F. the product was spoonable. The freezer flow test showed: virtually no flow at 3 minutes; 2 ml. at 5 minutes; 4 ml. at 10 minutes and 6 ml. at 15 minutes. A penetrometer test at freezer temperature gave a value of 25.2 mm, whereas a commercially available control sample (Rich's sour) gave a penetrometer reading of 1.3 mm. Thus the sour cream dressing can be used immediately upon removal from the freezer with a softness and flowability for easy application to other foods or for direct eating.

EXAMPLE 36

A pancake batter can be made in accordance with the present invention which is sufficiently free-flowing at freezer temperatures to be poured or squeezed from a container. The product can be maintained indefinitely in a freezer and upon removal from the freezer can be poured, without defrosting, onto a griddle to make pancakes in the conventional manner. The pancakes made from the batter can be frozen and stored indefinitely but will remain soft at freezer temperature. The pancakes therefore can be used directly from the freezer by quickly warming them, unlike conventional frozen pancakes which need to be defrosted or subjected to extensive heating to soften them throughout. The pancakes and waffles can be stored at room temperature or at refrigerator temperature for many days without spoilage.

The pancake batter of this invention comprises about from 15 to 45% water, but preferably about from 30 to 40% water, sugar in a ratio to water about from 1–1.5:1, about from 2.5 to 10% fat, minor amounts of conventional salts and leavening agents and other conventional additives and the remainder flour and usually an egg product and/or a milk product. The wide choice of flours available for ordinary pancakes is applicable for this invention, such as the bread flour shown below or a combination of wheat flour, bleached or unbleached, with a minor amount of corn flour and/or rice flour. The foregoing amounts can of course be varied as desired in accordance with the known properties of the ingredients and as further explained in this specification to maintain the desirable properties of the product. It is preferred that the sugars used be substantially low molecular weight. For example, about from 10 to 40% of the sugar can be fructose with about from 50 to 100% of the remainder of the sugar in the formulation being dextrose. A small part of the sugar used may be replaced by an amount of polyhydric alcohols sufficient to provide an equivalent osmotic effect, such as glycerol (see U.S. Pat. No. 3,753,734). Edible oils or shortenings may be used; preferably an unsaturated fat. A pancake batter formulation was made from the following ingredients in the indicated amounts.

| Ingredients | Amount |
| --- | --- |
| (1) Liquid Egg White | 32.26 |
| (2) Dextrose-Fructose Syrup | 19.42 |
| (3) Salt (NaCl) | 0.58 |
| (4) Dextrose | 20.33 |
| (5) Bread Flour | 19.42 |
| (6) Sodium Acid Pyrophosphate | 0.82 |
| (7) Sodium Bicarbonate | 0.60 |
| (8) Soybean Oil, Type 106 | 6.47 |
| | 100.00 |

The liquid egg white comprises 87.6% water and this in combination with the 29% water content of the Dextrose-Fructose Syrup gave a total water content of 33.98%. The fructose content of the formulation was 5.79%, and the dextrose content was 27.22%, whereas the total sugar content of the batter was 34.11%.

The batter was made by adding the liquid egg whites to a Norman mixer, adding the salts (3) and (6), metering in the dextrose-fructose syrup with agitation adding the dextrose (4) and bread flour, increasing the mixer rate to high speed, adding the soybean oil, finally adding the sodium bicarbonate and mixing all ingredients for five minutes. The formulation is then pumped to a cooled hold tank from which it is passed through a votator to cool it to 25°–28° F., from which it is pumped to another cooled holding tank.

Pancakes were made from this formulation on a greased and covered griddle, frozen and tested on a penetrometer against pancakes made from a conventional batter. The frozen pancake made from the formulation of this invention gave a penetrometer reading of 5.1 mm whereas the frozen standard pancake gave a reading of 1.1 mm. The pancake had a moisture content of 25.2%.

This formulation flows at about 20° F. The flow properties of this formulation and the other batters of this invention could be improved by using encapsulated sodium bicarbonate and sodium acid pyrophosphate to prevent the evolution of gases until heat is applied. This technique would be applied where a more fluid mixture is desired, because the evolution of carbon dioxide from the leavening agents in the product has a thickening effect. The encapsulation technique is also important where long-term storage stability is required. The foregoing batter is equally useful for making waffles and the like, although it is often desirable, particularly for waffles, to increase the fat content to twice that of pancakes to prevent adhesion to the baking grid.

By controlling the amount of sugar in the pancake batter the final product can be made sufficiently sweet so that a syrup or other sweetener is unnecessary. Moreover, in view of the high sugar content the addition of a small amount of water onto the finished pancake will produce a syrup-type topping as the water adsorbs sweetener and flavoring from the pancake. A maple or butter flavor may be added to the pancake to ehance this effect.

EXAMPLE 37

A donut batter and donut were made by the procedures of this invention. These have the properties of the batters and bakery products previously discussed. A particularly useful product is a donut with a filing and/or topping made in accordance with this invention. The flexibility of the donut batter enables the user to shape it upon removal from the freezer. The ability to store the donut at freezer temperature provides for its longterm stability while maintaining it in a ready to eat condition.

The donut batter comprises about from 15 to 30% water, sugar in a ratio to water about from 1–1.5:1; and about from 2 to 10% fat. The sugar preferably includes some fructose, for example, about from 10 to 40% of the total sugar may be fructose, and about from 50 to 100% of the remaining sugar is dextrose. The fat is preferably unsaturated. The batter also includes salts, flavoring and flour.

An example of a donut batter formulation is

| Ingredient | | Amount |
| --- | --- | --- |
| (1) | Ginger | .19 |
| (2) | Nutmeg | .14 |
| (3) | Xanthan Gum | .05 |
| (4) | Calcium Phosphate | .81 |
| (5) | Ferric Orthophosphate | .03 |
| (6) | Magnesium Phosphate | .29 |
| (7) | Whole Egg Powder | 1.29 |
| (8) | Sodium Acid Pyrophosphate | .61 |
| (9) | Sodium Bicarbonate | .44 |
| (10) | Salt | .57 |
| (11) | Bread Flour | 28.17 |
| (12) | Cake Flour | 4.78 |
| (13) | Corn Oil | 3.82 |
| (14) | Coloring | .01 |
| (15) | Egg White (88% water) | 23.9 |
| (16) | Dextrose | 11.0 |
| (17) | Fructose-Dextrose Syrup | 23.9 |
| | | 100.00 |

The amount of water in the formulation was 27.96% and the amount of sugar was 27.96% (7.13% frustose, 19.48% dextrose, and 1.36% higher sugars).

The batter was made by placing the egg whites (15) into a Hobart mixer, adding the dextrose (16) and dispersing it completely with the paddle mixer, and then adding the syrup (17) and mixing thoroughly. A premix of ingredients (1) through (14) were then added and mixed first at low speed for a minute and then at medium speed for two minutes. After standing for ten minutes the donuts were fried in the conventional manner. A partially hydrogenated shortening having an iodine value of 70 was used—and the donut absorbed close to 20% shortening.

The donut was placed in a freezer for 24 hours at −7° F. and upon removal it was immediately edible. The penetrometer reading was 3.1 mm compared to a conventional donut which had a value of 1.7; after standing at room temperature for fifteen minutes the donut made as described above had a penetrometer reading of 6.3 whereas the conventional donut had a value of 2.8. These figures are significant in view of the fact that frying the donuts leads to a crisp and firm shell with a softer interior.

EXAMPLE 38

A whipped topping made in accordance with this invention has the same advantages as the butter cream discussed in connection with the preceding example. The whipped topping has less hard butter and a higher unsaturated fat content than the butter cream formulation; the ingredients are otherwise equivalent. The product retains its texture at freezer temperatures and is microbiologically stable. This product also has the property of being whipped at freezer temperature rather than requiring the expensive and time consuming technique of first taking it to room temperature, whipping it and then cooling it.

The whippable topping of this invention and the whipped product made from it comprise an oil-in-water emulsion having about from 25 to 45% water, preferably about from 30-40% water, sugar in a ratio to water of about from 1-1.5:1, and about from 10 to 30% fat. The quantities of each type of sugar and fat may be the same as in the butter cream formulation, however in the whipped topping, generally higher amounts of unsaturated fats are used, i.e. 40% or more unsaturated fat and up to about 60% based on the total fat content. Although unsaturated fats have been considered to have an adverse effect on the stability of protein-containing foams it has been found that this combination of ingredients is suitable for the whipped products described in this specification. Conventional additives are also used in this formulation. Variations in the ingredients and their amounts guided by the foregoing can be accomplished in accordance with principles well-known in the art—see for example "The Role of Ingredients In the Formulation of Whipped Toppings" by W. H. Knightly, Food Technology, Vol. 22, pp. 73-86, June 1968.

A ready-to-whip cream base was prepared from the following components.

| Ingredient | | Amount |
|---|---|---|
| (1) | Water | 25.22 |
| (2) | Dextrose-Fructose Syrup | 36.72 |
| (3) | Xanthan Gum | .04 |
| (4) | Sucrose | .26 |
| (5) | Methocel 65 HG | .26 |
| (6) | Soy Protein Concentrate | 1.67 |
| (7) | Dextrose | 10.57 |
| (8) | Salt | .14 |
| (9) | Polysorbate 60 | .28 |
| (10) | Hexaglyceryl Distearate | .10 |
| (11) | Hard Butter | 9.50 |
| (12) | Corn Oil | 15.00 |
| (13) | Tenox 22 antioxidant | .01 |
| (14) | Lecithin | .10 |
| (15) | Flavoring | .03 |

-continued

| Ingredient | | Amount |
|---|---|---|
| (16) | Potassium Sorbate | .10 |
| | | 100.00 |

The procedure for making the topping formulation was the same as that described for the butter cream. The formulation was placed in a freezer with a conventional Whip Topping (unwhipped) until equilibrium was reached. The topping of this invention flowed readily when frozen, as follows: 115 ml. in 1 minute, 210 ml. in 3 minutes, 310 ml. in 5 minutes, 400 ml. in 10 minutes and 435 ml. in 15 minutes. The conventional whip topping did not flow at all in 15 minutes. The Whip topping formulation of this invention after being whipped and frozen had a penetrometer value of 10.1 mm. A conventional topping (Rich's pre-whip) had a penetrometer value of 6.5 mm. The product had a water activity of 0.875 (at 71° F.) and a pH of 6.62. The product had a polyunsaturated to saturated ratio (P/S) of 0.74 (based on corn oil having a saturated content of 14% and a polyunsaturated content of 57%, and hard butter being 100% saturated). A P/S of 0.38–0.74 is useful.

The formulation was whipped rapidly to an overrun of 2.56. The whipped product had a light and smooth texture which was retained at freezer temperature.

EXAMPLE 39

A low-fat whipped cream having the same benefits as the foregoing butter cream and whipped topping was prepared. This product, as indicated, is low in fat content, but retains an excellent texture over a wide range of temperatures.

This low fat whipped cream is a microbiologically stable oil-in-water emulsion which contains about from 10 to 15% fat, about from 25 to 45% water, preferably about from 30-40% water, and sugar in a ratio to water of about from 1-2:1. The fat content is preferably about from 10 to 25% unsaturated fat.

The amount of fructose plus dextrose equals at least 50% and up to 100% of the total sugar, with the fructose being from about 15 to 65% of the total sugar.

A low-fat ready-to-whip base was made as follows:

| Ingredient | | Amount |
|---|---|---|
| (1) | Water | 19.22 |
| (2) | Corn Syrup | 25.76 |
| (3) | Dextrose-Fructose Syrup | 30.68 |
| (4) | Xanthan Gum | .04 |
| (5) | Sucrose | .26 |
| (6) | Methocel 65 HG | .26 |
| (7) | Soy Protein Concentrate | 1.66 |
| (8) | Dextrose | 10.52 |
| (9) | Salt | .14 |
| (10) | Polysorbate 60 | .28 |
| (11) | Hexaglyceryl Distearate | .10 |
| (12) | Hard Butter | 9.45 |
| (13) | Tenox 22 antioxidant | .5 |
| (14) | Soybean Oil | 1.0 |
| (15) | Lecithin | .1 |
| (16) | Flavoring | .03 |
| | | 100.00 |

This product was made by the procedure set forth in Example 1. It had a total water content of 33.91% (including the water in the corn syrup and in the dextrose-fructose syrup). The whipped cream has 9.15% fructose, 23.09% dextrose and a total sugar content of 52.53%.

The mixture, which had a pH of 6.5, was whipped promptly after being made. An overrun of 2.73 was obtained in a whipping time of 3-½ minutes to give a marshmallow type product with a specific gravity of 0.36. It was spoonable at freezer temperature and pourable at refrigerator temperature. A similar formulation with 10.45% hard butter instead of the above combination of of saturated-unsaturated fat did not have the pourable consistency of the formulation of this example, but was still spoonable. A second sample of the formulation was frozen, held for four days, thawed and whipped. An overrun of 2.90 was obtained with a whipping time of 4 minutes.

The product was used on a cupcake and in a layer cake with satisfactory results.

The effect of quinine salt addition to the food products of this invention is a reduction in the sweeness of the food product as perceived upon ingestion of the foodstuff. In many cases, the decreased perception of sweeness associated with the quinine imbued food product is on the order of 50% of that of the unmodified composition. Addition of quinine substances to food products to lessen the perceived sweetness of such compounds is postulated to be achieved through masking of the excessive sweetness occasioned by the sugar through the inherent bitterness of the quinine substance. It is further believed that this bitterness reduces the duration of perceived sweetness by altering the manner in which the sweetness of the sugar is physiologically perceived. This theory is offered solely by means of explanation, however, and is not intended to limit the scope of the above invention exclusively to this theory.

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the scope of this invention and the following claims.

What is claimed is:

1. A microbiologically stable food product comprising water, sugar and flavoring which is characterized by a water activity of about 0.75 to about 0.93, and by being substantially non-crystalline at freezer temperatures, provided that in said sugar the amount of dextrose plus fructose is at least about 50% based upon the total sugar content, said ingredients being adapted to provide a product which will flow at about 10° F.

2. The microbiologically stable food product of claim 1 comprising water, sugar, and at least one of fructose and unsaturated fat, wherein the product is substantially non-crystalline at freezer temperatures and comprises about from 15 to 55% water, sugar in a ratio to water of about from 0.8–2:1 and a minor but effective amount of flavoring, provided that the solutes content is adequate to provide the product with a water activity of about 0.8 to 0.9, and in said sugar the amount of dextrose plus fructose is at least about 50% based upon the total sugar content.

3. The microbiologically stable food product of claim 2, wherein in said sugar the amount of fructose and dextrose is at least about 75% by weight based on the total sugar content.

4. The microbiologically stable food product of claim 2, wherein said sugar component comprises a dextrose-fructose syrup.

5. The microbiologically stable food product according to claim 4, wherein said dextrose-fructose syrup comprises about 23.5% water and about 76.5% sugar, wherein said sugar comprises about 55% fructose and about 45% dextrose.

6. The microbiologically stable food product according to claim 4, wherein said syrup comprises about: 29% water and 71% sugar, said sugar comprising about 42% fructose and 50% dextrose.

7. The microbiologically stable food product according to claim 2, wherein said sugar component is comprised of dextrose and a fructose-dextrose syrup.

8. The product of claim 2 also comprising up to about 125 p.m.m. of a quinine salt selected from the group consisting of quinine sulfate, quinine bisulfate and quinine hydrochloride.

9. The product of claim 2 also comprising from about 2 to about 75 p.p.m. of a quinine salt selected from the group consisting of quinine sulfate, quinine bisulfate and quinine hydrochloride.

10. The food product according to claim 2 wherein the product includes fat, emulsifier and stabilizer, the product comprises an oil-in-water emulsion.

11. The food product according to claim 10 wherein the fat component is comprised of at least about 10% of an unsaturated fat and the sugar is comprised of a fructose-dextrose syrup.

12. The food product according to claim 11 wherein the fructose-dextrose syrup is comprised of about 42% to about 90% fructose.

13. The food product according to claim 12 wherein the sugar to water ratio is about 1.5–1:1.

14. The food product according to claim 10 wherein the amount of fructose is about 15% to about 65% based on the total sugar content, and the amount of dextrose is at least about 50% based on the remaining sugar content.

15. The food product according to claim 14 wherein the product is comprised of about 10% to about 30% fat.

16. The food product according to claim 10 wherein the sugar component is comprised of at least about 10% to about 40% fructose, the amount of fructose plus dextrose is at least about 75%, and the fat component is an unsaturated fat.

17. The food product according to claim 16 comprised of about 2% to about 25% of an unsaturated fat.

18. The food product according to claim 17 wherein the sugar component is comprised of a fructose-dextrose syrup comprised of about 42% to about 90% fructose.

19. The food product according to claim 2 wherein the product contains fructose but does not contain fat, and the sugar component is comprised of about 75% fructose plus dextrose based on the total sugar content, and at least about 10% to about 30% fructose based on the total sugar content.

20. The food product according to claim 19 wherein the sugar component is comprised of a fructose-dextrose syrup comprised of about 42% to about 90% fructose.

21. The food product according to claim 19 wherein the amount of fructose plus dextrose is at least about 75% of the total sugar content.

22. The food product according to claim 21 wherein the sugar comprises a fructose-dextrose syrup comprised of about 42% to about 90% fructose.

23. A method of making a microbiologically stable food product which is substantially non-crystalline at freezer temperatures and which flows at about 10° F. which comprises the steps of:
   a. forming a mixture comprising water, sugar, flavoring and, at least one of, fructose and unsaturated fat, wherein the mixture comprises about from 15 to 55% water, sugar in a ratio to water of about from 0.8-2:1 and a minor but effective amount of flavoring, provided that the solutes content is adequate to provide the product with a water activity of about from 0.8 to 0.9, the amount of fat is less than the amount of water, and in said sugar the amount of dextrose plus fructose is at least about 50% based upon the total sugar content;
   b. pasteurizing the mixture;
   c. homogenizing the pasteurized mixture; and
   d. cooling the resultant product to between about −5° F. and about 10° F.

24. The method as recited in claim 23, wherein the mixture formed further comprises up to about 125 p.p.m. of a quinine salt selected from the group consisting of quinine sulfate, quinine bisulfate and quinine hydrochloride.

25. A microbiologically stable food product comprising about from 15 to 45% water, sugar in a ratio to water of about from 1-2:1, about 2.5 to 30% fat, and minor but effective amounts of salt, emulsifier, stabilizer and flavoring, provided that the amount of fat is less than the amount of water, the solutes content is adequate to provide the product with a water activity of about from 0.8 to 0.9, in said sugar the amount of dextrose plus fructose is at least about 50% based upon the total sugar content, wherein the foregoing ingredients comprise at least one of fructose and unsaturated fat and the product is spoonable at about 10° F.

* * * * *

UNITED STATES PATENT AND TRADEMARK OFFICE
CERTIFICATE OF CORRECTION

PATENT NO. : 4,387,109                              Page 1 of 2

DATED      : June 7, 1983

INVENTOR(S) : Marvin L. Kahn et al

It is certified that error appears in the above—identified patent and that said Letters Patent is hereby corrected as shown below:

On the title page, under "Related U.S. Application Data", line 10, change "Apr." to --Mar.--

Col. 1, line 13, change "4,327,146" to --4,237,146--.

Col. 2, line 11, change "fuel" to --feel--.

Col. 2, line 48, change "sice" to --since--.

Col. 4, lines 23-24, after "emulsion" change ".It" to -- , it--.

Col. 9, line 40, change "amount" to --about--.

Col. 17, line 58, change "is" to --are--.

Col. 30, line 68, change ";" to -- . --.

UNITED STATES PATENT AND TRADEMARK OFFICE
CERTIFICATE OF CORRECTION

PATENT NO. : 4,387,109

DATED : June 7, 1983

INVENTOR(S) : Marvin L. Kahn et al

It is certified that error appears in the above—identified patent and that said Letters Patent is hereby corrected as shown below:

Col. 34, line 10, change "dispending" to --dispensing--.

Col. 34, line 18, change "aout" to --about--.

Col. 37, line 15, change "saute'" to --sauté--.

Col. 37, line 24, change "saute'ed" to --sautéed--.

Col. 44, line 15, change "ehance" to --enhance--.

Col. 47, line 20, change "sweeness" to --sweetness--.

Signed and Sealed this

Twentieth Day of September 1983

[SEAL]

Attest:

GERALD J. MOSSINGHOFF

Attesting Officer

Commissioner of Patents and Trademarks